(12) United States Patent
Lord

(10) Patent No.: US 10,042,038 B1
(45) Date of Patent: Aug. 7, 2018

(54) MOBILE DEVICES AND METHODS EMPLOYING ACOUSTIC VECTOR SENSORS

(71) Applicant: Digimarc Corporation, Beaverton, OR (US)

(72) Inventor: John D. Lord, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 0 days.

(21) Appl. No.: 15/255,114

(22) Filed: Sep. 1, 2016

Related U.S. Application Data

(60) Provisional application No. 62/213,083, filed on Sep. 1, 2015.

(51) Int. Cl.
| | |
|---|---|
| *G01S 5/26* | (2006.01) |
| *G10L 25/51* | (2013.01) |
| *G10L 25/30* | (2013.01) |
| *G10L 21/10* | (2013.01) |

(52) U.S. Cl.
CPC ............ *G01S 5/26* (2013.01); *G10L 21/10* (2013.01); *G10L 25/30* (2013.01); *G10L 25/51* (2013.01)

(58) Field of Classification Search
CPC . G01S 5/26; G10L 21/10; G10L 25/30; G10L 25/51
USPC .......................................................... 381/56
See application file for complete search history.

(56) References Cited

U.S. PATENT DOCUMENTS

| | | | |
|---|---|---|---|
| 5,930,201 A | 7/1999 | Cray | |
| 7,839,721 B1 * | 11/2010 | Clark | ..................... H04R 3/005 367/119 |
| 8,548,494 B2 | 10/2013 | Agarwal et al. | |
| 9,305,559 B2 | 4/2016 | Sharma et al. | |
| 2004/0091125 A1 | 5/2004 | Choe et al. | |
| 2006/0104598 A1 | 5/2006 | Gilles et al. | |
| 2009/0003621 A1 | 1/2009 | Greywall | |
| 2009/0282025 A1 | 11/2009 | Winter et al. | |
| 2011/0138902 A1 | 6/2011 | White et al. | |
| 2012/0214515 A1 | 8/2012 | Davis et al. | |
| 2012/0214544 A1 | 8/2012 | Shivappa et al. | |
| 2015/0168538 A1 | 6/2015 | Bradley et al. | |
| 2016/0216363 A1 * | 7/2016 | Martin | ..................... G01S 3/801 |

(Continued)

FOREIGN PATENT DOCUMENTS

| | | |
|---|---|---|
| WO | WO1999035470 | 7/1999 |
| WO | WO2012004626 | 1/2012 |
| WO | WO2012156774 | 11/2012 |

OTHER PUBLICATIONS

Jing et al.; "Sound source localisation using a single acoustic vector sensor and multichannel phase arrays", Nov. 16-19, 2014.*

(Continued)

*Primary Examiner* — David Ton

(74) *Attorney, Agent, or Firm* — Digimarc Corporation

(57) ABSTRACT

Acoustic vector data is sensed via acoustic vector sensor configurations in mobile devices and used to generate sound fields. From these sound fields, positioning and orientation of the mobile device is derived. The sound fields and features derived from them are classified to provide mobile device position and other information about the environment from which the sound fields are captured. Additionally, sound fields are analyzed to detect gestural input and trigger associated programmatic actions.

18 Claims, 10 Drawing Sheets

(56) References Cited

U.S. PATENT DOCUMENTS

2017/0178664 A1* 6/2017 Wingate .............. G10L 21/0308

OTHER PUBLICATIONS

B. A. Cray, A. H. Nuttall, "Directivity Factors for Linear Arrays of Velocity Sensors," J. Acoust. Soc. Am., vol. 110, No. 1, pp. 324-331 (Jul. 2001).

A. Nehorai, E. Paldi, "Acoustic Vector-Sensor Array Processing," IEEE Trans. Sig. Proc., vol. 42, No. 9, pp. 2481-2491 (Sep. 1994).

M. Hawkes, A. Nehorai, "Acoustic Vector-Sensor Beamforming and Capon Direction Estimation," IEEE Trans. Sig. Proc., vol. 46, No. 9, pp. 2291-2304 (Sep. 1998).

Hawkes, Malcolm, and Arye Nehorai. "Acoustic vector-sensor processing in the presence of a reflecting boundary." Signal Processing, IEEE Transactions on 48.11 (2000): 2981-2993.

Hawkes, Malcolm, and Arye Nehorai. "Acoustic vector-sensor correlations in ambient noise." Oceanic Engineering, IEEE Journal of 26.3 (2001): 337-347.

Bree, Hans-Elias, "An Overview of Microflown Technologies," Acta acustica united with Acustica 89.1 (2003), p. 163-172.

Yntema, D. R., J. W. Van Honschoten, and Remco Wiegerink, "Integrated 3D Sound Intensity Sensor with Four-Wire Particle Velocity Sensors," Symposium on Design, Test, Integration and Packaging of MEMS/MOEMS, IEEE, 2008.

Wind, Jelmer, H. De Bree, and Buye Xu, "3D sound source localization and sound mapping using a PU sensor array," published at CEAS-AIAA, Stockholm (2010).

Wind, Jelmer W., Emiel Tijs, and Hans-Elias Bree, "Source localization using acoustic vector sensors: A Music approach," Noise and Vibration: Emerging Methods NOVEM 2009 (Apr. 2009): 100-1-100-8.

Shujau, Muawiyath, C. H. Ritz, and I. S. Burnett, "Designing Acoustic Vector Sensors for localization of sound sources in air," EUSIPCO 2009 (2009).

Shujau, Muawiyath, "In air acoustic vector sensors for capturing and processing of speech signals," University of Wollongong Thesis Collection (2011).

Shujau, Muawiyath, C. H. Ritz, and I. S. Burnett, "Using in-air acoustic vector sensors for tracking moving speakers." 4th International Conference on Signal Processing and Communication Systems (ICSPCS), IEEE, 2010.

Banser, Frederic Allen, "Micromachined biomimetic optical microphones with improved packaging and power consumption," (2012).

Bicen, Baris, "Micromachined diffraction based optical microphones and intensity probes with electrostatic force feedback," (2010).

White, Robert D., et al., "MEMS Microphone Array on a Chip for Turbulent Boundary Layer Measurements" (2012).

Krause, Joshua Steven, "Micromachined microphone array on a chip for turbulent boundary layer measurements," (2011).

Wiederhold et al., Comparison of methods for processing acoustic intensity from orthogonal multimicrophone probes, J. Acoust. Soc. Am. 131 (4), Apr. 2012.

Fricke, Julius T., et al. "Source Localization With Acoustic Vector Sensors," Proceedings of the Acoustics High Tatras, 34th International Acoustical Conference—EAA Symposium, 2009.

Kolundzija, Mihailo, Christof Faller, and Martin Vetterli, "Spatiotemporal gradient analysis of differential microphone arrays," Journal of the Audio Engineering Society 59.1/2 (2011): 20-28.

Dean Schmidlin (2011), Direction-Selective Filters for Sound Localization, Advances in Sound Localization, Dr. Pawel Strumillo (Ed.), ISBN: 978-953-307-224-1, InTech, DOI: 10.5772/15920.

Tichaysky, Petr, Kainam Thomas Wong, and Michael D. Zoltowski, "Near-field/far-field azimuth and elevation angle estimation using a single vector hydrophone," Signal Processing, IEEE Transactions on 49.11 (2001): 2498-2510.

Awad, Mohamad Khattar, and Kainam Thomas Wong. "Recursive Least-Squares Source Tracking using One Acoustic Vector Sensor." Aerospace and Electronic Systems, IEEE Transactions on 48.4 (2012): 3073-3083.

Xu, Yougen, Zhiwen Liu, and Jinliang Cao. "Perturbation analysis of conjugate MI-ESPRIT for single acoustic vector-sensor-based noncircular signal direction finding." Signal Processing 87.7 (2007): 1597-1612.

Lai, Hung, Kristine Bell, and Henry Cox. "DOA estimation using vector sensor arrays." Signals, Systems and Computers, 2008 42nd Asilomar Conference on. IEEE, 2008.

Yunchao, Gao, et al. "Application of complex empirical mode decomposition in separation of multiple targets using a single vector sensor." Neural Networks and Signal Processing, 2008 International Conference on. IEEE, 2008.

Rahamim, Dayan, Joseph Tabrikian, and Reuven Shavit, "Source localization using vector sensor array in a multipath environment," Signal Processing, IEEE Transactions on 52.11 (2004): 3096-3103.

T. Basten, He de Bree, and WF Druyvesteyn, "Multiple incoherent sound source localization using a single vector sensor." ICSV16, Krakow, Poland (2009).

Song, Yang, and Kainam Thomas Wong. "Three-Dimensional Localization of a Near-Field Emitter of Unknown Spectrum, using an Acoustic Vector Sensor Corrupted by Additive Noise of Unknown Spectrum." Aerospace and Electronic Systems, IEEE Transactions on 49.2 (2013): 1035-1041.

Neven et al., "Image Recognition with an Adiabatic Quantum Computer I. Mapping to Quadratic Unconstrained Binary Optimization," Arxiv preprint arXiv:0804.4457, 2008.

Le et al, Building High-Level Features Using Large Scale Unsupervised Learning, arXiv preprint arXiv:1112.6209 (2011).

Coates et al, Deep Learning with COTS HPC Systems, Proceedings of the 30th International Conference on Machine Learning (ICML-13), 2013.

Nowak, et al, Sampling strategies for bag-of-features image classification, Computer Vision—ECCV 2006, Springer Berlin Heidelberg, pp. 490-503.

Fei-Fei et al, A Bayesian Hierarchical Model for Learning Natural Scene Categories, IEEE Conference on Computer Vision and Pattern Recognition, 2005.

* cited by examiner

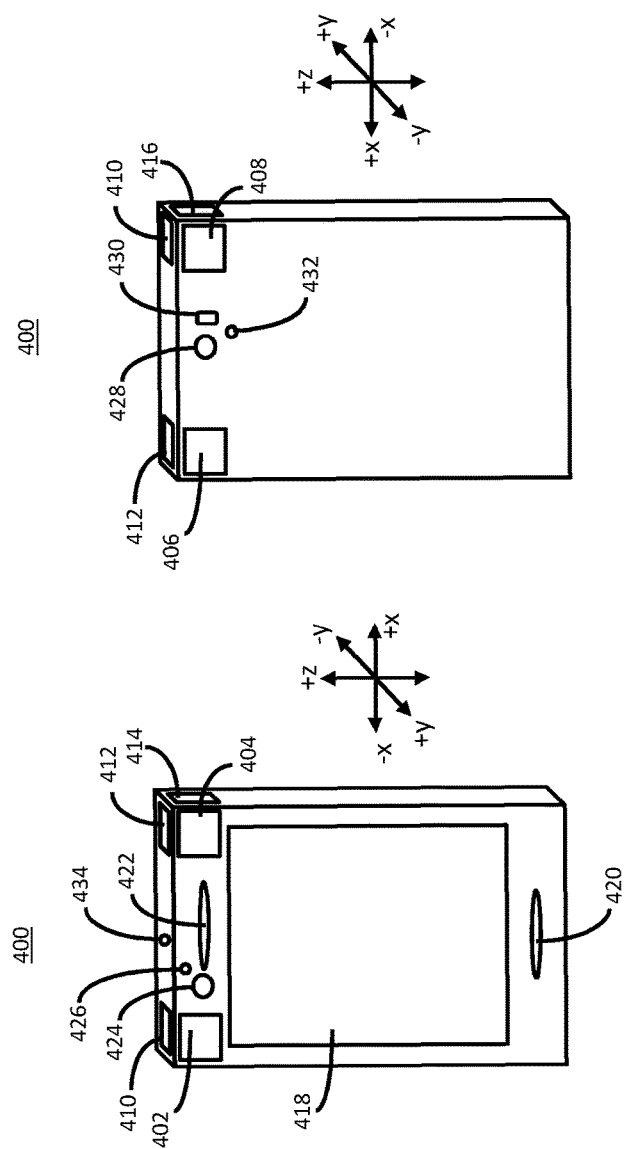

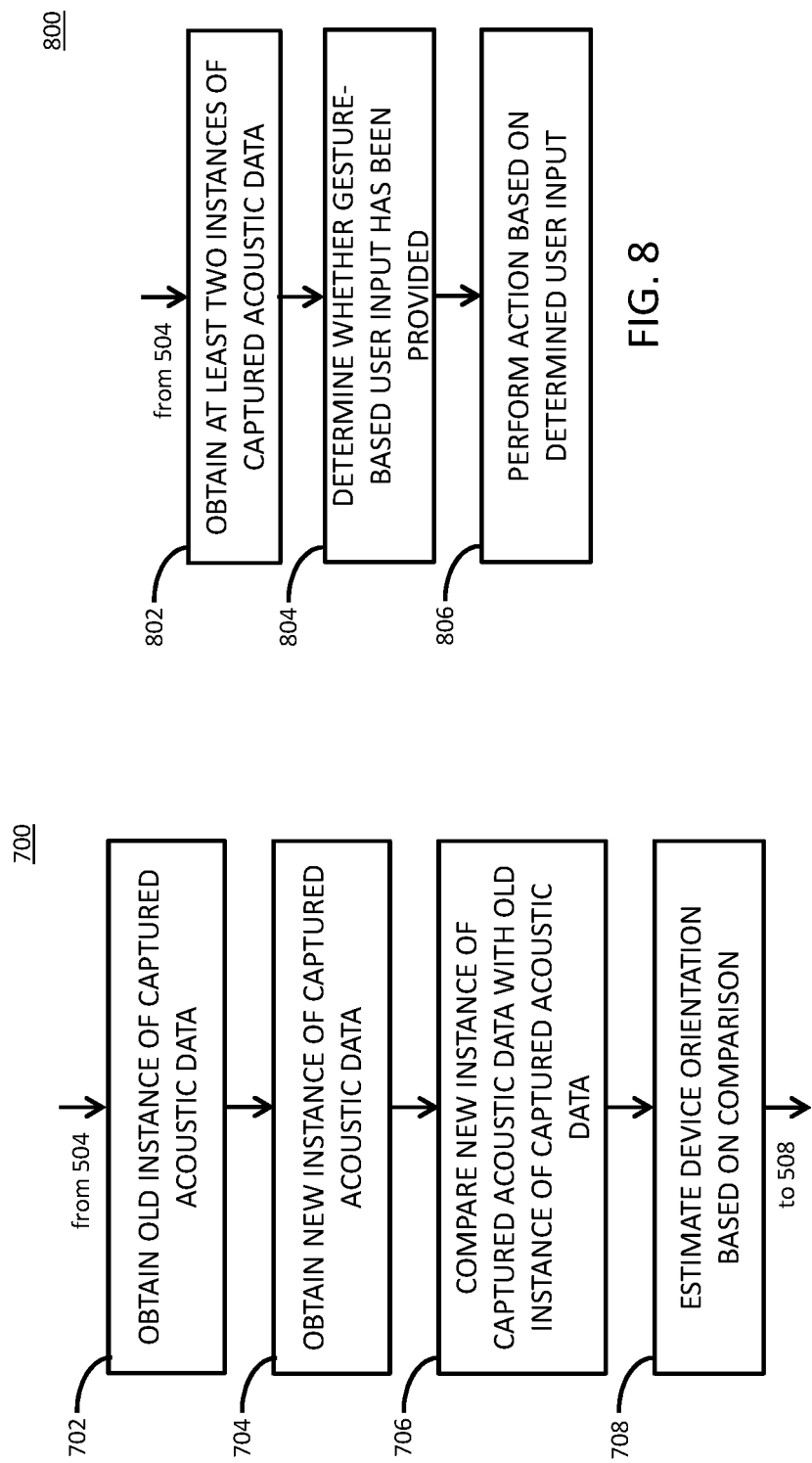

MOBILE DEVICES AND METHODS EMPLOYING ACOUSTIC VECTOR SENSORS

RELATED APPLICATION DATA

This Application claims benefit of U.S. Provisional Application No. 62/213,083, filed Sep. 1, 2015.

TECHNICAL FIELD

Embodiments of the present invention generally relate to systems and methods that enable a portable device to determine its position within an environment based on acoustic conditions associated with the environment. In particular, embodiments of the present invention relate to systems and methods for determining device position based on vector components of ambient sound waves captured at the device.

BACKGROUND

As mobile devices proliferate, the demand for services tailored to device location also increases. Location-based services depend on positioning systems to determine device location. Satellite based positioning systems, such as the Global Positioning System (GPS), GLONASS, and Galileo can provide high accuracy, but require a clear line of sight between the satellites and the mobile device to provide a location determination. Consequently, satellite positioning systems are largely ineffective for determination the location of a device within indoor environments. As used herein, an "indoor environment" refers to enclosed or semi-enclosed spaces, such as commercial (office) buildings, airport lounges, libraries, prisons, warehouses, underground parking, subway tunnels, etc.

Various systems for determining device position within indoor environments use RF or light-based wireless signaling technologies (e.g., via WiFi, Bluetooth, Bluetooth Low Energy, RFID, Li-Fi, IR, etc.), inertial navigation technologies, ultrasonic technologies (e.g., employing techniques such as TOF, TDOA, etc.), and the like. Many of these technologies, however, require the installation and maintenance of base stations, wireless access points, beacons, etc., in order to work, and require complicated additional hardware in the device. However, it would be desirable to determine the location of a device locate a device within an indoor environment without the need for much added hardware or complexity.

SUMMARY

One aspect of the invention is a method that processes acoustic vectors to determine spatial arrangement of a device. The method obtains acoustic reference data associated with an environment. This acoustic reference data describes attributes of sound sources in an environment. The method captures a vector component within an acoustic field proximate to a device arranged within the environment. It processes the captured vector component of a first acoustic vector field to generate first acoustic vector data. The method compares the first acoustic vector data with the acoustic reference data and determines a spatial arrangement of the device based on the comparing.

Another aspect of the invention is method for classifying sound sources. The method captures acoustic vector sensor data from an acoustic vector sensor configuration having plural axes. The method converts this acoustic vector sensor data into a sound map, and classifies sound sources within the sound map with a trained classifier. One particular classifier is a convolutional neural network, which is trained to identify sound sources within the sound map.

One type of classifier is trained to identify and located sound sources within sound maps. This type provides sound maps labeled with sound source and source location, which in turn, are processed further for various applications.

Another type of classifier is trained to classify a sound map derived from acoustic vector data by location, such as geolocation or indoor location.

Another aspect of the invention is a system with an acoustic vector sensor configuration. The system comprises a housing and an acoustic port extending through the housing. The system further comprises an acoustic vector sensor arranged within the housing and in fluid communication with an environment surrounding the device via the acoustic port. The acoustic vector sensor is configured to capture a vector component of an acoustic field proximate to an exterior of the device at the acoustic port and convert the captured vector component into an electrical signal. The system further comprises an output device, and a processor configured to access the electronic signal and control an operation of the output device based, at least in part, on the accessed electronic signal.

Additional inventive features are detailed in the description, and particularly, in section entitled Exemplary Inventive Features.

Additional aspects of the invention include methods implemented in instructions executing on mobile devices, server systems, or executing on a combination of both.

Further features will become apparent with reference to the following detailed description and accompanying drawings.

BRIEF DESCRIPTION OF THE DRAWINGS

FIG. 4A is a perspective view schematically illustrating a front side of a device incorporating a plurality of acoustic vector sensors, according to one embodiment.

FIG. 4B is a perspective view schematically illustrating a back side of the device shown in FIG. 4A.

FIG. 7 is a flow chart illustrating a process of estimating an orientation of a device within an environment in the process shown in FIG. 5, according to one embodiment.

FIG. 8 is a flow chart illustrating a process of discerning gesture-based user input from captured acoustic data, according to one embodiment.

DETAILED DESCRIPTION

Figure 1:
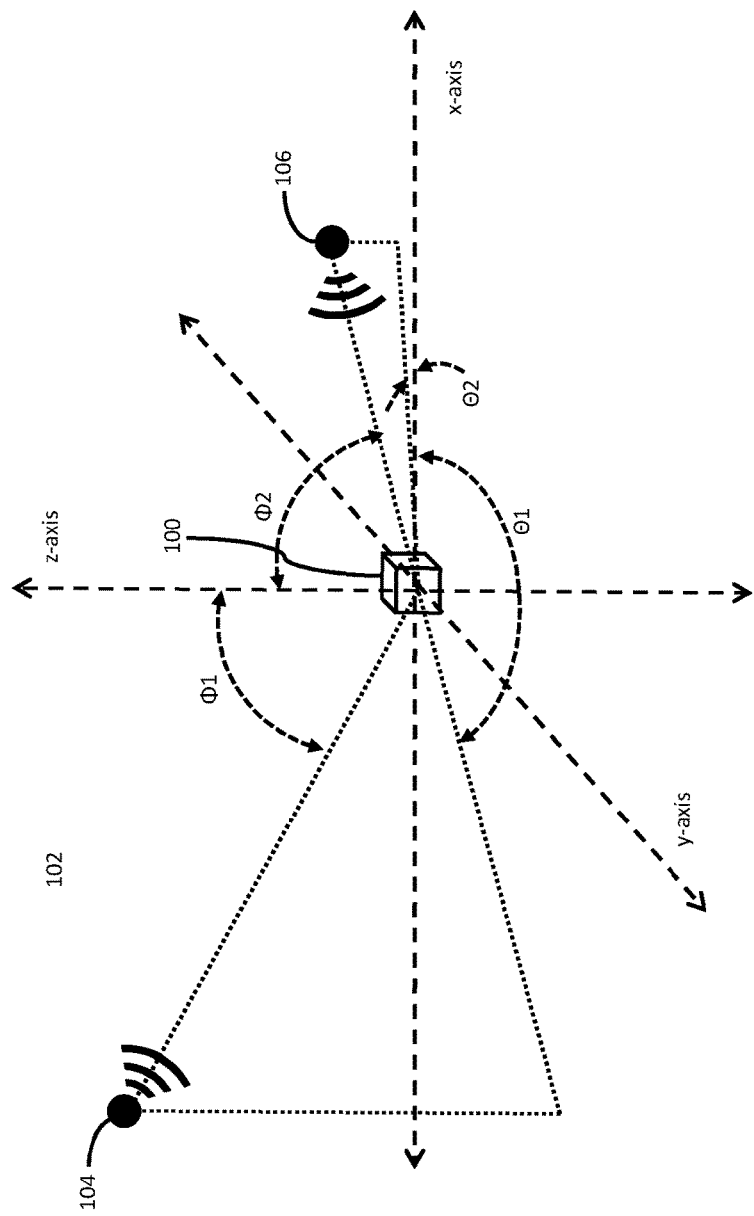
FIG. 1 schematically illustrates exemplary spatial relationships between a device arranged within an environment and sound sources associated with the environment.

Embodiments exemplarily described herein relate to systems and methods that use information derived from one or more captured vector components of sound propagating within an environment to enable an electronic device, present within the environment, to perform a variety of operations (e.g., related to positioning, navigation, gesture recognition, sound processing, and the like). Before getting into the details of particular implementations of device and sensor configurations, signal processing methods and use-case scenarios, we start with a general discussion of the device and sensor configurations, contemplated environments and sound sources where the disclosed embodiments may be realized, and an overview of information that can be derived from sensors associated with the device.

I. Overview—Sound, Device, Environment, Sound Sources

Sound is a sensed vibration propagating through some medium such as air (or may be transmitted through a liquid, or through a suitably elastic solid). The speed with which a sound wave propagates through a medium (e.g., air) can be described by the following:

$$v_s = \sqrt{\frac{K}{p}},$$

where $v_s$ is the speed of the sound wave (measured in m/s), K is the modulus of bulk elasticity of the propagating medium, and p is the density of the propagating medium. A sound wave propagating through a medium displaces molecules or other particles within the medium, causing the particles to oscillate about some equilibrium position by the frequency associated with the sound wave. Particle vibrations in the medium induce local pressure fluctuations in medium (also referred to herein as "sound pressure") as the sound wave propagates. The relationship between the speed with which the particles oscillate about their equilibrium position (also referred to as "particle velocity") and sound pressure can be described by the following:

$$v_p = \frac{p}{z},$$

where $v_p$ is the particle velocity (e.g., measured in m/s), p is the RMS sound pressure (e.g., measured in Pa) and Z is the acoustic impedance of the medium (e.g., measured in Pa·s/m).

As shown above, sound consists of a scalar component (e.g., sound pressure) and a vector component (e.g., particle velocity). Numerous types of acoustic scalar sensors (i.e., various types of microphones such as electret condenser microphones) have been devised to measure the sound pressure of a propagating sound wave. More recently, acoustic vector sensors capable of measuring particle velocity have been developed to detect and localize sources of sound. See G. L. D'Spain, W. S. Hodgkiss, G. L. Edmonds, "Energetics of the Deep Ocean's Infrasonic Sound Field," J. Acoust. Soc. Am., Volume 89, Number 3, pages 1134-1158 (March 1991); V. A. Shchurov, A. V. Shchurov, "Noise Immunity of a Combined Hydroacoustic Receiver," Acoustical Physics, Volume 48, Number 1, pages 98-106 (January 2002); and Benjamin A. Cray, "Acoustic Vector Sensing Sonar System," U.S. Pat. No. 5,930,201, each of which is incorporated herein by reference. Analytical models of vector acoustic sensor systems have been developed to evaluate their detection performance (see B. A. Cray, A. H. Nuttall, "Directivity Factors for Linear Arrays of Velocity Sensors," J. Acoust. Soc. Am., Volume 110, Number 1, pages 324-331 (July 2001), incorporated herein by reference) and their localization performance (see A. Nehorai, E. Paldi, "Acoustic Vector-Sensor Array Processing," IEEE Trans. Sig. Proc., Volume 42, Number 9, pages 2481-2491 (September 1994); M. Hawkes, A. Nehorai, "Acoustic Vector-Sensor Beamforming and Capon Direction Estimation," IEEE Trans. Sig. Proc., Volume 46, Number 9, pages 2291-2304 (September 1998), each of which is incorporated herein by reference).

Referring to FIG. 1, an electronic device, such as device 100, is physically arranged within an environment, generally designated at 102. Broadly, the environment 102 may be any outdoor environment (e.g., a park, a football stadium, a parking lot, a carnival, an amusement park, an amphitheater, a neighborhood street, etc.) an indoor environment (e.g., a mall, a gym, a retail store, a museum, an airport, a movie theatre, a hotel, a library, a home, an office building, a car, an airplane, etc.).

Generally, the environment 102 is one through which sound can propagate. Sound propagating through the environment 102 typically emanates from one or more sound sources associated with the environment 102, such as first sound source 104 and second sound source 106. Although the environment 102 is illustrated as including only two sound sources (i.e., first sound source 104 and second sound source 106), it will be appreciated that the environment 102 may include any number of sound sources. Depending on the particular environment 102, an associated sound source can be any structure, device, machine, object (e.g., tree, grass, river, ocean, vehicle, loudspeaker, motor, engine, printer, telephone, buzzer, bell, fan, keyboard, squeaky door, wall, ceiling, floor, window, cubicle partition, pillar, bookshelf, ventilation duct, person, etc.), or the like, or any combination thereof, capable of generating, reflecting, refracting or diffracting sound. A sound source can be a characterized as a so-called "point source" (e.g., a loudspeaker playing music, or sound induced in free-air by modulated ultrasonic beams such as the "sound laser"), a "line source" (e.g., a stream of vehicles on a distant highway at rush-hour), a "plane source" (e.g., footsteps on a floor, items on a table or countertop, noise coming through a wall or reflected from a building, or a train barreling through a tunnel), or any combination thereof. Sound emanating from a sound source associated with the environment 102 may be steady or intermittent, and may have one or more frequencies in the normal human-audible range (i.e., 20 Hz to 20 kHz, or thereabout) or one or more frequencies above or below the normal human-audible range, or any combination thereof.

The device 100 may be provided as, or otherwise be incorporated within or communicatively coupled to, any suitable electronic device such as a computing device (e.g., a desktop computer, laptop computer, tablet computer, a handheld computer, etc.), a mobile communication device (e.g., a mobile telephone, cellular telephone, smartphone, radio transceiver—aka "walkie talkie", etc.), a digital media player, a personal navigation device, a digital camera, a microphone, headphones, a wearable electronic device (e.g., having a finger-, wrist-, arm-, leg-, or head-mountable form factor), a game console, a game controller, a household appliance (e.g., a thermostat, a refrigerator, a microwave, an intercom, a baby monitor, a security system, etc.), a remote control, or the like or any combination thereof.

Figure 2:
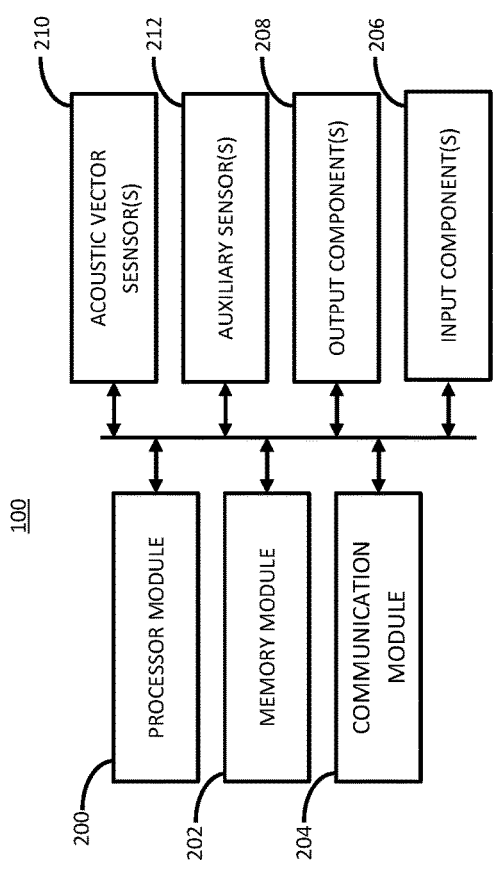
FIG. 2 schematically illustrates components associated with a device such as the device shown in FIG. 1.

Referring to FIG. 2, the device 100 may include many one or more components, such as a processor module 200, a memory module 202, a communication module 204, a user input component 206, a user output component 208, an acoustic vector sensor 210, an auxiliary sensor 212, or the like or any combination thereof.

The processor module 200 may include one or more microprocessors (e.g., the Intel Atom, the ARM A5, the Qualcomm Snapdragon, the nVidia Tegra 4, or the like or any combination thereof), graphics processing units (e.g., the nVidia Tegra APX 2600, the Adreno 330), digital signal processors (e.g., the Texas Instruments TMS320 and OMAP series devices), vision processors (e.g., the Movidius Myriad 1), depth processors (e.g., the PrimeSense SoC CARMINE and CAPRI series devices), audio processors (e.g., the Freescale Semiconductor DSP56K family of DSPs, the Tensilica Diamond Standard 330HiFi audio DSP, etc.), programmable logic devices, field programmable gate arrays (e.g., the Xilinx Virtex series devices), field programmable object arrays, application specific circuits (e.g., including digital, analog and mixed analog/digital circuitry), or any similar component or any combination thereof.

The memory module 202 may include any type of semiconductor memory such (e.g., a volatile memory SRAM, DRAM, or the like or any combination thereof, a non-volatile memory such as PROM, EPROM, EEPROM, NVRAM (also known as "flash memory"), or the like or any combination thereof), magnetic memory (e.g., a floppy disk, hard-disk drive, magnetic tape, etc.), optical memory (e.g., CD-ROM, CD-R, CD-RW, DVD, Holographic Versatile Disk (HVD), Layer-Selection-Type Recordable Optical Disk (LS-R), or the like or any combination thereof), or any similar component or any combination thereof. Generally, one or more components of the memory module 202 can be used to store software instructions (e.g., to be executed by one or more components of the processor module 200) as well as any information or data generated by any of the components of the processor module 200 (or any other component of the device 100) and other data files (e.g., contact information such as phone numbers, email addresses, fax numbers, website addresses, etc., calendar information such as times/dates associated with appointments, events, etc., image files, video files, audio files, ring tones, haptic signatures, archived text messages, websites, documents, emails, maps, floor plans, data describing layouts of parks, zoos, theatres, retail shopping malls, grocery stores, libraries, airports, etc., or the like or any combination thereof.).

The communication module 204 can include circuitry and/or other technology enabling the device to communicate with other devices via a wireless connection (e.g., GSM, 3G, 4G, CDMA, WiFi, WiMax, Zigbee, RFID, NFC, Bluetooth, Bluetooth Low Energy, DSRC, or the like or any combination thereof), via a wired connection (e.g., through an Ethernet local area network, through a phone connector (e.g., a TS connector, a TRS connector, a TRRS connector, or the like or any combination thereof), USB, FIREWIRE, or the like or any combination thereof.

User input components 206 are generally configured to allow a user to control or otherwise manipulate an operation supported by the device 100. Examples of user input components that may be suitably or desirably used in conjunction with the device 100 include a button, keyboard, keypad, joystick, mouse, a touch-screen or other gesture sensor, a microphone, a camera or other image sensor, or the like or any combination thereof.

User output components 208 are generally configured to allow the device 100 to indicate the effects of the user's manipulation. Examples of user output components that may be suitably or desirably used in conjunction with the device 100 include a haptic actuator (e.g., an eccentric rotating mass, a linear resonant actuator, or any other actuator or device capable inducing haptic effects using technologies that include electroactive polymers, piezoelectric materials or other technologies involving electrostatic or subsonic audio wave surface actuation, or the like or any combination thereof), a display (e.g., an LCD display, a light-emitting diode (LED) display, an organic LED (OLED) display, a quantum dot LED (QD-LED) display, an e-ink display, or the like, or any combination thereof), a projector, a loudspeaker, an indicator light, or the like or any combination thereof.

As will be described in greater detail below, an acoustic vector sensor 210 is configured to sense a vector component (e.g., particle velocity, pressure gradient, etc.) of sound propagating through the environment 102 at the device 100. Generally, an acoustic vector sensor 210 can be provided as a uniaxial acoustic vector sensor (i.e., sensitive to a vector component of sound in only one sensing direction), as a biaxial acoustic vector sensor (i.e., sensitive to a vector component of sound in two, usually orthogonal, sensing directions), or the like.

Examples of types of acoustic vector sensors that may be used in accordance with embodiments exemplarily described herein include inertial acoustic vector sensors, pressure gradient acoustic vector sensors, or the like, or any combination thereof. Generally, the acoustic vector sensor can sense vector components of sound having a frequency in a range from 0.1 Hz to 20 kHz (or thereabout). Depending upon the particular type and configuration, however, an acoustic vector sensor can sense vector components of sound having a frequency of less than 0.1 Hz or greater than 20 kHz.

An inertial acoustic vector sensor measures the velocity of particles (e.g., air molecules) moving across a set of closely-spaced, heated sensor wires or filaments. Exemplary inertial acoustic vector sensors that may be used in conjunction with the embodiments exemplarily described herein include those of the type manufactured by MICROFLOWN TECHNOLOGIES, as described in Bree, Hans-Elias, "An Overview of Microflown Technologies," Acta acustica united with Acustica 89.1 (2003), p. 163-172, which is incorporated herein by reference; as described in Yntema, D. R., J. W. Van Honschoten, and Remco Wiegerink, "Integrated 3D Sound Intensity Sensor with Four-Wire Particle Velocity Sensors," Symposium on Design, Test, Integration and Packaging of MEMS/MOEMS, IEEE, 2008, which is incorporated herein by reference; as described in Wind, Jelmer W., Emiel Tijs, and Hans-Elias Bree, "Source localization using acoustic vector sensors: A MUSIC approach." (2009), which is incorporated herein by reference; as described in Shujau, Muawiyath, C. H. Ritz, and I. S. Burnett, "Designing Acoustic Vector Sensors for localization of sound sources in air," EUSIPCO 2009 (2009), which is incorporated herein by reference; as described in Shujau, Muawiyath, "In air acoustic vector sensors for capturing and processing of speech signals," University of Wollongong Thesis Collection (2011), which is incorporated herein by reference; as described in Shujau, Muawiyath, C. H. Ritz, and I. S. Burnett, "Using in-air acoustic vector sensors for tracking moving speakers." 4th International Conference on Signal Processing and Communication Systems (ICSPCS), IEEE, 2010, which is incorporated herein by reference; as described in U.S. Patent App. Pub. No. 2009/003621, which is incorporated herein by reference; as described in WO 99/35470, which is incorporated herein by reference, or the like or a combination thereof.

A pressure gradient acoustic vector sensor can consist of an array of pressure sensor elements, a ribbon microphone, or one or more pressure gradient sensor elements, or the like or any combination thereof, and measure a pressure gradient associated with a propagating sound wave. Exemplary pressure gradient acoustic vector sensors that may be used in conjunction with the embodiments exemplarily described herein include those of the type described in Banser, Frederic Allen, "Micromachined biomimetic optical microphones with improved packaging and power consumption," (2012), which is incorporated herein by reference; as described in Bicen, Baris, "Micromachined diffraction based optical microphones and intensity probes with electrostatic force feedback," (2010), which is incorporated herein by reference; as described in White, Robert D., et al., "MEMS Microphone Array on a Chip for Turbulent Boundary Layer Measurements" (2012), which is incorporated herein by reference; as described in Krause, Joshua Steven, "Micromachined microphone array on a chip for turbulent boundary layer measurements," (2011), which is incorporated herein by reference; as described in U.S. Patent App. Pub. No. 2009/003621, which is incorporated herein by reference; as described in U.S. Patent App. Pub. No. 2011/0138902, which is incorporated herein by reference; or the like or a combination thereof.

Generally, an auxiliary sensor 212 can be provided as a position sensor (e.g., a GPS module including a GPS receiver chip, data logger, antenna, etc.), an image sensor (e.g., a digital camera having a resolution in a range of at least 2 megapixels, designed to capture imagery—whether still images or video), a light sensor (e.g., an ambient light sensor), a microphone (e.g., a condenser-type microphone such as an electret microphone, a MEMS microphone of the likes produced by WOLFSON ELECTRONICS, ANALOG DEVICES, AKUSTICA, INFINEON, KNOWLES ELECTRONICS, MEMSTECH, NXP SEMICONDUCTORS, SONION MEMS, etc., etc.), an accelerometer (e.g., a 3-axis accelerometer), a tilt sensor, a barometer, an altimeter, a gyroscope (e.g., a 3-axis gyroscope), a magnetometer (e.g., a 3-axis magnetometer), a chemical sensor, a motion tracking camera (e.g., a machine vision camera with a wide-angle lens), a depth sensor (e.g., an IR projector configured to project structured light into the environment, an IR camera, a sensor processor, etc.), or the like or any combination thereof. Data generated by one or more auxiliary sensors 212, or otherwise determined upon processing (e.g., by one or more components of the processor module 200) signals output from one or more auxiliary sensors 212, is herein generically referred to as "auxiliary sensor data" that is associated with one of more of the auxiliary sensors 212.

II. More Detail on Device Structure

Figure 3:
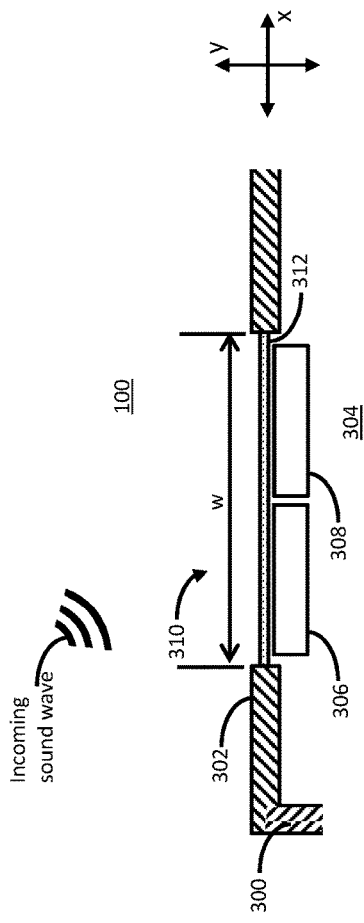
FIG. 3 is a partial, cross-sectional view schematically illustrating an aspect of the device shown in FIG. 1, according to one embodiment.

Having generally described the device 100 with respect to FIGS. 1 and 2, an exemplary discussion of some aspects relating to the integration of the acoustic vector sensors 210 with the device 100 will now be provided with respect to FIGS. 3, 4A and 4B.

Generally, the device 100 includes a housing 300 that generally defines the exterior surface(s) 302 of the device 100 and (at least partially) encloses a space 304 within which one or more acoustic vector sensors, such as a first acoustic vector sensor 306 and second acoustic vector sensor 308, are arranged. The housing 300 may be formed from any suitable or desirable material such as a glass, a ceramic, a glass-ceramic, a metal, a polymer, a ceramic, or the like, or any mixture, alloy, laminate, or other combination thereof. Further, the housing 300 may be provided as single monolithic piece, or as a plurality of individual pieces that are (or can be) bonded, welded, adhered, fastened, clamped, or otherwise assembled together. Although not shown, one or more of the other device components, or the like or any combination thereof, may also be arranged within the space 304 enclosed by the housing 300, or may be otherwise coupled to the housing 300.

In one embodiment, the device 100 is configured to minimize or otherwise reduce the likelihood that a sound wave propagating through the environment 102 will be undesirably attenuated upon reaching an acoustic vector sensor. By minimizing or reducing the likelihood that a sound wave will become attenuated before reaching an acoustic vector sensor, the accuracy and/or reliability with which a vector component of the incoming sound wave is sensed can be maintained at a suitable or desirable level. Accordingly, and with reference to FIG. 3, the device 100 may include an acoustic port 310 extending through the housing 300 (e.g., at a sensing location associated with the device 100) to place the first acoustic vector sensor 306 and the second acoustic vector sensor 308 in fluid communication with the environment outside the device 100.

In the illustrated embodiment, the first acoustic vector sensor 306 and the second acoustic vector sensor 308 are each arranged within a common acoustic port 310. In another embodiment, the first acoustic vector sensor 306 and the second acoustic vector sensor 308 are each arranged within separate acoustic ports 310. In yet another embodiment, one or both of the acoustic vector sensors can be arranged outside the acoustic port 310, but still be sufficiently close to the acoustic port 310 such that the vector component of a sound wave propagating through the acoustic port 310 can be sensed at the acoustic vector sensor. Generally, the maximum width of the acoustic port 310 (e.g., labelled in FIG. 3 as "w") will be roughly equal to or smaller than the wavelength of sound waves propagating in the environment 102 outside the device 100 (sound waves propagating through the environment 102 can have wavelengths ranging from about 1.7 cm (or less) to about 17 m (or more)). Therefore, the distance between an acoustic vector sensor and the acoustic port 310 should be kept relatively small to avoid or minimize any undesirable diffraction-based effects the sound wave may experience as it exits the acoustic port 310 (e.g., such that a velocity component of a sound wave remains at least substantially unchanged as the sound wave enters into acoustic port 310 and subsequently exits the acoustic port 310 to impinge on the acoustic vector sensor 210).

The exterior surface of the housing (or air pressure inside the device 100) may create localized high-pressure zones (or localized micro-flows of air) that could alter the Direction of Arrival (DOA) of an incoming sound wave. To ameliorate these effects, the microphones should be located near the exterior of the device and free of local reflections from exterior surfaces.

Sound diffraction around corners can be seen (using various stroboscopic laser interferometric and Schlieren imaging techniques to view local changes in air pressure caused by passing sound waves—making sound visible). A vector microphone placed internally within a cavity will see sound diffracted around edges of the cavity opening (sharper corners refracting higher frequencies locally, curved edges less so but still low frequencies). Diffraction scales with acoustic wavelengths, and longer wavelengths still refract on larger radius corners.

Absolute pressure affects speed of sound. Pressure gradients from low-frequency resonance within a space will set up a varying speed of sound of higher frequencies passing through that space. This effect can be exploited to create a transducer where a standing acoustic wave is set up in a cavity, orthogonal to the signal path to be analyzed, designed to modulate the refraction of another audio signal (e.g. ultrasonic signal) spreading it over an array of MEMS microphones.

In the illustrated example, the acoustic port 310 is provided as a single opening extending through the housing 300. In another embodiment, however, the acoustic port 310 can be provided as a set of localized, closely-spaced openings extending through the housing 300. In such an embodiment, it may be desirable to ensure that the aspect ratio of each opening (i.e., the ratio of the depth of the opening to the width of the opening) is sufficiently large to avoid or minimize any undesirable shadowing or polarizing effects on the exit-side of the acoustic port 310 (e.g., such that a velocity component of a sound wave remains at least substantially unchanged as the sound wave enters into acoustic port 310 and subsequently exits the acoustic port 310 to impinge on the acoustic vector sensor 210).

An acoustic mesh or grille 312 may be optionally provided to span the acoustic port 310. The acoustic mesh or grille 312 can be selected to improve the aesthetic appearance of the device 100 (e.g., by hiding or partially masking the acoustic port 310) without undesirably attenuating sound waves that might propagate through the acoustic port 310. The acoustic mesh or grille 312 can also help to prevent dust or other unwanted debris from entering into the interior space 304 of the device 100.

Although FIG. 3 illustrates an example embodiment in which the device 100 includes two acoustic vector sensors co-located at a common sensing location, it will be appreciated that the device 100 may include only a single acoustic vector sensor, or three or more acoustic vector sensors. In embodiments in which multiple acoustic vector sensors are co-located at a common sensing location, different acoustic vector sensors may be arranged or otherwise configured to have a different sensing direction. For example, the aforementioned first acoustic vector sensor 306 may be provided as a uniaxial acoustic vector sensor having a first sensing direction oriented along the "x"-axis, whereas the second acoustic vector sensor 308 may be provided as a uniaxial acoustic vector sensor having a second sensing direction different from the first sensing direction (e.g., such that the second sensing direction is oriented along the "y"-axis or the "z"-axis; refer to FIG. 1 for an illustration of the spatial relationships among the "x"- "y"- and "z"-axes). Notwithstanding the above, it will be appreciated that the first sensing direction may be oriented at any suitable or desirable angle relative to the second sensing direction.

Constructed as exemplarily described above, the configuration of the housing and the number and arrangement of acoustic port(s) and acoustic vector sensor(s), can determine the spatial extent (e.g., measured in terms of one or more ranges of azimuthal angles, one or more ranges of elevation angles, or the like or any combination thereof, with respect to some reference coordinate system associated with the device 100 such as the Cartesian coordinate system illustrated in FIG. 1) across which one or more vector components of an incoming sound wave can be sensed (also referred to herein as a "sensing range") by an individual acoustic vector sensor. Further, depending on the configuration and arrangement of the acoustic port(s) and acoustic vector sensors associated with the device 100, the sensing range of two or more acoustic vector sensors may spatially overlap one another, may be spatially separated from one another, or the like or a combination thereof. For example, and with reference to FIGS. 4A and 4B, a device (e.g., a smartphone 400) may include an acoustic vector sensor or a set of co-located acoustic sensors (e.g., as described above with respect to FIG. 2) arranged at one or more sensing locations on the smartphone 400, such as sensing locations 402, 404, 406, 408, 410, 412, 414 and 416.

As shown in FIGS. 4A and 4B, sensing locations 402 and 404 are arranged at a front side of the smartphone 400 (e.g., where components such as a touchscreen display 418, microphone 420, loudspeaker 422, camera 424 and ambient light sensor 426 are located), sensing locations 406 and 408 are arranged at a back side of the smartphone 400 (e.g., where components such as another camera 428, LED torch 430 and another microphone 432 are located), sensing locations 410 and 412 are arranged at an upper peripheral side of the smartphone 400 (e.g., where yet another microphone 434 is located), and sensing locations 414 and 416 are arranged at opposite lateral peripheral sides of the smartphone 400. Although FIGS. 4A and 4B illustrate a particular arrangement and selection of components such as cameras, microphones, etc., it will be appreciated that the smartphone 400 may include more or fewer of the illustrated components, and locations of such components may differ from the illustrated locations. It will further be appreciated that the smartphone 400 may include additional components such as a mechanically-engagable power ON/OFF button, an audio volume toggle, a mute switch, head-phone jack, dock connector, motion tracking camera, depth sensor, or the like or any combination thereof.

The sensing range of one or more acoustic vector sensors arranged at sensing location 402 may optionally overlap with the sensing range of one or more acoustic vector sensors arranged at sensing location 404. Likewise, the sensing range of one or more acoustic vector sensors arranged at sensing location 406 may optionally overlap with the sensing range of one or more acoustic vector sensors arranged at sensing location 408. Similarly, the sensing range of one or more acoustic vector sensors arranged at sensing location 410 may optionally overlap with the sensing range of one or more acoustic vector sensors arranged at sensing location 412. Further, the sensing range of one or more acoustic vector sensors arranged at sensing location 410 can overlap with the sensing range of one or more acoustic vector sensors arranged at sensing location 402, sensing location 408 and/or sensing location 416. Likewise, the sensing range of one or more acoustic vector sensors arranged at sensing location 412 can overlap with the sensing range of one or more acoustic vector sensors arranged at sensing location 404, sensing location 406 and/or sensing location 414. However, the sensing range of one or more acoustic vector sensors arranged at sensing location 414 do not overlap with the sensing range of one or more acoustic vector sensors arranged at sensing location 416.

III. Overview—Data/Signal Processing

Referring back to FIG. 1, upon sensing a vector component of an incoming sound wave, each acoustic vector sensor of the device 100 generates a corresponding electrical signal (also referred to herein as an "acoustic vector signal"), thereby capturing a vector component of sound propagating within the environment 102 at the device 100. One or more or all generated acoustic vector signals can be processed (e.g., at one or more components of the processor module 200) to generate data (also referred to herein as "captured acoustic data") that describes one or more acoustic conditions associated with the environment 102. Examples of acoustic conditions include particle velocity associated with each sound wave propagating through the environment 102 at the device 100 (also referred to herein as a "particle velocity profile"), the DOA of each of the propagating sound waves (also referred to herein as a "DOA profile"), an estimated location of a sound source relative to the device 100 (also referred to herein as a "sound source arrangement", which can be determined based on the DOA profile by any suitable or desirable method), or the like or any combination thereof.

The DOA of a propagating sound wave can be characterized by, for example, one or both of an azimuth angle, $\theta$, and an elevation angle, $\phi$, each measured relative to a center of the device 100. Thus, upon processing the acoustic vector signal generated by one or more acoustic vector sensors associated with the device 100, the DOA of sound emanating from one or more sound sources within the environment 102 may be determined or estimated. For example, the DOA of sound emanating from the first sound source 104 can be characterized by a first azimuth angle, $\theta 1$, a first elevation angle, $\phi 1$, or the like or a combination thereof. Likewise, the DOA of sound emanating from the second sound source 106 can be characterized by a second azimuth angle, $\theta 2$, a second elevation angle, $\phi 2$, or the like or a combination thereof.

It will be appreciated that the DOA associated with a sound can be determined using one or more suitable techniques such as the Polarization Smoothing Algorithm (PSA), Recursive Least Squares (RLS), ESPIRIT, Multiple Signal Classification (MUSIC), Root-MUSIC, Capon, or the like or any combination thereof. Examples of techniques that may be used to estimate or otherwise determine the DOA associated with a sound include those described in Shujau, Muawiyath, C. H. Ritz, and I. S. Burnett, "Designing Acoustic Vector Sensors for localization of sound sources in air," EUSIPCO 2009 (2009); Shujau, Muawiyath, "In air acoustic vector sensors for capturing and processing of speech signals," University of Wollongong Thesis Collection (2011); Nehorai, Arye, and Eytan Paldi, "Acoustic vector-sensor array processing," Signal Processing, IEEE Transactions on 42.9 (1994): 2481-2491; Fricke, Julius T., et al. "SOURCE LOCALIZATION WITH ACOUSTIC VECTOR SENSORS, "Proceedings of the Acoustics High Tatras, 34th International Acoustical Conference—EAA Symposium, 2009, which is incorporated herein by reference; Kolundzija, Mihailo, Christof Faller, and Martin Vetterli, "Spatiotemporal gradient analysis of differential microphone arrays," Journal of the Audio Engineering Society 59.1/2 (2011): 20-28; Wind, Jelmer, H. De Bree, and Buye Xu, "3D sound source localization and sound mapping using a PU sensor array," published at CEAS-AIAA, Stockholm (2010); Wind, Jelmer W., Emiel Tijs, and Hans-Elias Bree, "Source localization using acoustic vector sensors: A MUSIC approach," Noise and Vibration: Emerging Methods NOVEM 2009 (April 2009): 100-1-100-8; and Dean Schmidlin (2011), Direction-Selective Filters for Sound Localization, Advances in Sound Localization, Dr. Pawel Strumillo (Ed.), ISBN: 978-953-307-224-1, InTech, DOI: 10.5772/15920. Available from: http://www.intechopen.com/books/advances-in-sound-localization/direction-selective-filters-for-sound-localization, M. Hawkes, A. Nehorai, "Acoustic Vector-Sensor Beamforming and Capon Direction Estimation," IEEE Trans. Sig. Proc., Volume 46, Number 9, pages 2291-2304 (September 1998); Feng, Haihong, Guolong Liang, and Junying Hui. "The direction estimation using combined sensor with pressure and particle velocity." ACTA ACUSTICA-PEKING-25.6 (2000): 516-520; Tichaysky, Petr, Kainam Thomas Wong, and Michael D. Zoltowski, "Near-field/far-field azimuth and elevation angle estimation using a single vector hydrophone," Signal Processing, IEEE Transactions on 49.11 (2001): 2498-2510; Lanyue, SUN Guiqing YANG Desen ZHANG, and S. H. I. Shengguo. "Maximum likelihood ratio detection and maximum likelihood DOA estimation based on the vector hydrophone [J]." Acta Acustica 1 (2003): 012; Awad, Mohamad Khattar, and Kainam Thomas Wong. "Recursive Least-Squares Source Tracking using One Acoustic Vector Sensor." Aerospace and Electronic Systems, IEEE Transactions on 48.4 (2012): 3073-3083; Hawkes, Malcolm, and Arye Nehorai. "Acoustic vector-sensor processing in the presence of a reflecting boundary." Signal Processing, IEEE Transactions on 48.11 (2000): 2981-2993; Hawkes, Malcolm, and Arye Nehorai. "Acoustic vector-sensor correlations in ambient noise." Oceanic Engineering, IEEE Journal of 26.3 (2001): 337-347; Xu, Yougen, Zhiwen Liu, and Jinliang Cao. "Perturbation analysis of conjugate MI-ESPRIT for single acoustic vector-sensor-based noncircular signal direction finding." Signal Processing 87.7 (2007): 1597-1612; Lai, Hung, Kristine Bell, and Henry Cox. "DOA estimation using vector sensor arrays." Signals, Systems and Computers, 2008 42nd Asilomar Conference on. IEEE, 2008; Yunchao, Gao, et al. "Application of complex empirical mode decomposition in separation of multiple targets using a single vector sensor." Neural Networks and Signal Processing, 2008 International Conference on. IEEE, 2008; Rahamim, Dayan, Joseph Tabrikian, and Reuven Shavit, "Source localization using vector sensor array in a multipath environment," Signal Processing, IEEE Transactions on 52.11 (2004): 3096-3103; T. Basten, H E de Bree, and W F Druyvesteyn, "Multiple incoherent sound source localization using a single vector sensor." ICSV16, Krakow, Poland (2009); and Song, Yang, and Kainam Thomas Wong. "Three-Dimensional Localization of a Near-Field Emitter of Unknown Spectrum, using an Acoustic Vector Sensor Corrupted by Additive Noise of Unknown Spectrum." Aerospace and Electronic Systems, IEEE Transactions on 49.2 (2013): 1035-1041, all of which are incorporated herein by reference.

In one particular embodiment, the vector direction of sound is recovered from the signal amplitude measured on a configuration of orthogonally oriented, co-located vector sensors. In this case, the signal processing of the digitized signal sampled from the sensors makes the approximation that the same sound signal level passes over two or three mutually orthogonally oriented, co-located, vector sensors. The signal processing method recovers vector direction of a sound from the signal amplitude of the sound measured on the sensors. The sound signals captured from plural directions is converted into a sound map. For multiple unknown sound sources, numerous methods are proposed by research in the field to estimate a sound source map. See, e.g., Wiederhold et al., Comparison of methods for processing acoustic intensity from orthogonal multimicrophone probes, J. Acoust. Soc. Am. 131 (4), April 2012, which is incorporated herein by reference.

In one embodiment, for example, the sound map is computed continually (at a spatial and frequency resolution). This sequence is examined for time and spatial features, and these features mapped, in conjunction with other transducer information in estimating motion, orientation, and location of the microphone system in time.

One helpful analogy of this embodiment is Structure from Motion ("SfM") used to construct a 3D map of physical objects in a scene captured by a digital camera. In SfM, image frames are captured over time from a camera (e.g., a color digital video camera). Each frame is a two dimensional array of image samples comprising luminance and or color values. Feature extraction, such as the feature extraction of SIFT or SURF, is applied to image frames. The extracted features from different frames are matched. The feature trajectories over time are then used to reconstruct 3D positions of the features and camera's motion. For example, a bundle adjustment method is performed on feature locations within a sequence of image frames of a scene captured by a camera at different camera positions. In some implementations, this geometric information is directly estimated from image frames without intermediate feature extraction. This process generates a map of the depth and orientation of features in scene relative to the camera.

In the case of sound field processing, the signals captured from the vector sensor provide a sound field captured per unit of time, like sound field frame or sound field capture period. The instances of each sound field may be three dimensional, corresponding to direction and amplitude of sound signals sampled at each direction, or may be mapped into sound image, such as a 2D sound image array, in which 3D directions are mapped into a 2D sound image array. The amplitude may correspond to amplitude of a sampled time varying audio signal sampled at a direction. It may also correspond to a spectral vector, corresponding to the spectral content of the sound captured from a direction over a period of time. With the sound fields captured, sound fields captured from different units of time are matched to track common sound features over time, which enables the position and motion of the capture device to be ascertained, like SfM enables tracking of camera motion and orientation. Prior to matching, particular sound features may be extracted, e.g., spectral peaks or other audio features that are identified in a field and are trackable over time.

Additionally, the device emits chirps (or other sounds) that are reflected from the surroundings, which enables vector audio sensors to "hear" when there are no ambient noise sources—objects in the surroundings become "illuminated" by the emitted chirps. A chirp is a signal in which the frequency increases (up-chirp) or decreases (down-chirp) with time. A simple, short duration chirp signal may be composed of a sequence of tones. These may be played in the upper range of human hearing e.g., 18 to 22 kHz, yet still within the frequency range of the acoustic sensor.

When a device is stationary, the signal processing of the sound fields captured over time accumulates features from intermittent sound sources to complete the spatial map. Some sound sources such a as refrigerator compressor or air-conditioning will be intermittent (even the repetitively intermittent nature is a sound feature over long-term). Other features such as location of footsteps that typically lie along certain paths within a room, drawers or doors that are opened/closed, though intermittent, have regions in-which they occur (footsteps in the plane of the floor, within confines of a room or hallway), or very specific fixed locations (the latch on a door, microwave oven beeper, doorbell).

Sound emanating from a doorway may be arbitrary in content, but localized in space when viewed as a 3D sound-field. The frequency-profile of sound passing through the doorway will be limited by the aperture size, and appear as a characteristic feature of the sound (especially when viewed over a longer period).

In one embodiment, the captured acoustic data can further be generated by taking the delay and amplitude settings of a rake receiver as the spatial fingerprint. In one embodiment, there is a rake receiver for each acoustic vector sensor. In another, there is a rake receiver corresponding to sound signal captured from each of a plurality of different directions in the sound field. Each rake receiver has multiple correlators operating at different delays; the outputs from the multiple correlators of each receiver are combined. The resultant data is combined with more exact directional analysis of each echo, giving a unique location fingerprint at the device 100. In some embodiments, the rake receiver provides a form of multipath correction.

In one embodiment, acoustic vector signals generated by one or more acoustic sensors can be processed with auxiliary sensor data associated with one or more microphones to generate captured acoustic data describing one or more other acoustic conditions (or an estimate thereof) associated with the environment 102. Examples of such other acoustic conditions can include, sound pressure of one or more of the sound waves propagating through the environment 102 at the device 100 (also referred to herein as a "sound pressure profile"), sound intensity of one or more of the propagating sound waves (also referred to herein as a "sound intensity profile") and spectral content of one or more of the propagating sound waves (also referred to herein as a "spectral content profile"). In this embodiment, auxiliary sensor data associated with a scalar component (e.g., sound pressure) of sound captured by a microphone (also referred to as "sound data") is typically generated at least substantially contemporaneously with the generation of the acoustic vector signals. In one implementation, sound data that is processed with an acoustic vector signal can be associated with sound captured by a microphone that is co-located (e.g., within the same sensing location) with an acoustic vector sensor that generated the acoustic vector signal. In another implementation, however, sound data that is processed with an acoustic vector signal can be associated with sound captured by a microphone (e.g., microphone 420, microphone 432 and/or microphone 434) that is not co-located with an acoustic vector sensor that generated the acoustic vector signal.

In one embodiment, one or more acoustic vector signals can be processed to compute a fingerprint characterizing one or more acoustic conditions associated with the environment 102 (e.g., in terms of spatial distribution of sound sources within the environment 102). Exemplary algorithms used to calculate the fingerprint can include SIFT, SURF, ORB and CONGAS. SIFT, SURF and ORB are each implemented in the popular OpenCV software library, e.g., version 2.3.1. CONGAS is used by Google Goggles for that product's image recognition service, and is detailed, e.g., in Neven et al., "Image Recognition with an Adiabatic Quantum Computer I. Mapping to Quadratic Unconstrained Binary Optimization," Arxiv preprint arXiv:0804.4457, 2008. The computed fingerprint may thus form at least part of the captured acoustic data.

In another embodiment, the acoustic vector signals are processed by a trained Convolutional Neural Network (CNN) to detect sound features in sound fields. The CNN is implemented in software instructions, for example, using cuda-convnet, cuda-convnet2, or derivatives. The CNN is trained based on a data set of sound features to be detected. Then, sound fields are fed to the trained CNN, which detects sound features in the sensed sound fields. The detected sound features may be presented on a graphical depiction of the surrounding environment on the display of the mobile device, in which the sound fields are captured. This graphical depiction may be presented in an augmented reality display in which the graphical depiction of the detected sound sources are positioned at locations in a video display of video captured of the surrounding scene, corresponding to the locations of the sound sources.

Hardware support for CNN (like convnet programming code examples noted) is now being included in mobile-phone chipsets (such as the latest Qualcomm Snapdragon 820 series processors which will contain Neural Processing Units (NPUs)), which facilitates implementation of the CNN on a mobile device. The Tensilica Vision P5 and P6 DSPs from Cadence includes features for implementing sound field processing employing CNNs on a power constrained embedded system.

For some applications, the sound field processing pipeline has the following stages: pre-processing, region of interest (ROI) selection, modeling of the region of interest, and decision making. object detection, object recognition, and decision making. In pre-processing, the processor maps the acoustic vector sensor output into a sound map, e.g., using methods referenced above. For example, the processor converts the acoustic vector sensor input into a sound map comprising a DOA profile of sound sources around the device 100.

In the ROI stage, the processor performs processes such as sound source detection, sound source segmentation, sound feature extraction, and/or labeling of connected sound components. For example, the processor applies sound source localization on the sampled acoustic vector sensor output to localize plural sound sources, e.g., using methods referenced above.

In modeling of the ROI, the processor performs sound source recognition, sound source tracking, sound source feature matching or gesture recognition.

Finally, in decision making, the processor determines whether a match exists or flags detected events, which trigger further actions associated with matches or events.

Machine learning methods such as SVM or CNNs play a role in one or more stages, such as sound source detection and recognition.

Each of the stages may be optimized for low power processing within an embedded system, by implementing the stage with instructions executed within above mentioned DSP, GPU, e.g., with NPUs to implement a CNN. A CNN is comprised of one or more convolutional layers, pooling/subsampling layer (subsampling layer), a non-linear layer and fully connected layer. Convolution layers perform the role of a feature extractor. In a convolution layer, the input is convolved with a filter kernel. The filer kernel weights are derived from a training process (e.g., in which a CNN is trained on a dataset of labeled sounds or sound profiles). The convolution of inputs with filter kernels involves many multiply-accumulate (MAC) operations. As such, these operations are preferably performed within a GPU or DSP with the capability to perform billions of MAC operations per sound.

The subsampling layer reduces the resolution of the features, e.g., by max pooling or average pooling. For example, for an input of 4×4 with 2×2 sub-sampling, the input is divided into four non-overlapping regions of size 2×2. The max and average of the non-overlapping regions is output, respectively, for max and average pooling.

The non-linear layers apply a "trigger" function to signal distinct identification of a likely feature in a layer of the CNN. These layers are implemented by a non-linear unit, such as a rectified linear unit (ReLU), hyperbolic tangent, absolute hyperbolic tangent, or sigmoid function.

The fully connected layer are often the final layer of a CNN and provide a weighted sum of previous layer features.

For max pooling and ReLU operations, the processor in the device preferably has instructions to execute vector comparison operations in one cycle, so that plural features are processed in parallel. Non-linear functions with finite ranges like tan h and signum are implemented with a look up table, preferably one that executes plural look ups in parallel. Further, instructions for comparisons and look up table get scheduled in parallel with multiply/multiply accumulate instructions.

The fully connected layer requires significant load/store bandwidth, and as such, the DSP should be selected to process plural 512 bit load/store operations per cycle.

In one implementation, the signal processing of the sensed acoustic vectors are converted into a 3D image of the sound field per unit of time. The 3D image is then fed to the trained CNN, which recognizes sound features from the training set and maps them to locations in a space corresponding to the scene around the mobile device. Sampling the sensor data, the signal processing on the device constructs instances of the 3D sound field image continuously from the sound vector sensor output, rather like a video sequence. Each sound field image is then fed to the CNN to recognize "objects", sound sources, it has been trained to recognize. Thus the observed types, location/orientation/size (distance) of each sound source "object" is mapped to the known environment to determine location.

In one application, the CNN is trained on sounds of rooms to be recognized. Recognition of the sound field of a room then provides the location of the mobile device relative to the pre-stored location of the room and sound sources within it.

Relatedly, in another application, the CNN detects individual sound source types and locations and passes them to a controlling application program running on the device, which in turn, launches an action corresponding to the source type and location (as well as any other preference or contextual information associated with the action).

In one embodiment, the captured acoustic data is supplemented with one or more items of supplemental information generated by the device 100, stored locally at the device 100 (e.g., as one or more data files stored at the memory module 202), remotely accessible to the device 100 (e.g., via communication module 204) from a remote server (not shown), or the like or any combination thereof. In one embodiment, the captured acoustic data is automatically supplemented with this supplemental information (also referred to as "device-supplied supplemental information"). In another embodiment, the captured acoustic data is manually supplemented with device-supplied supplemental information by the user of the device 100. For example, during set-up of the process 500, the user may be prompted to identify which type(s) of device-supplied supplemental information to append to the captured acoustic data. In another example, the user may be prompted to identify which type(s) of device-supplied supplemental information to append to the captured acoustic data after the captured acoustic data has been generated. Examples of types of device-supplied supplemental information that can supplement the captured acoustic data include time information (e.g., identifying when the acoustic conditions described by the captured acoustic data were recorded, which can include time of day, day of week, month of year, etc.), weather information (e.g., identifying weather or atmospheric conditions present when the acoustic conditions described by the captured acoustic data were recorded, which can include temperature, humidity, precipitation type/amount, cloudiness, UV index, pollen count, etc.), calendar information (e.g., identifying an appointment, event, etc., associated with the location where the acoustic conditions described by the captured acoustic data were recorded), media information (e.g., an image file, video file, audio file, etc., associated with the location where the acoustic conditions described by the captured acoustic data were recorded), or the like or any combination thereof.

IV. Things to do with Captured Acoustic Data

Once generated, the captured acoustic data can be used (either alone or in conjunction with data obtained from one or more other components of the device 100), to support a variety of processes and functions, a few examples of which are described in greater detail below with respect to FIGS. 5 to 9.

A. Supporting Location-Based Services

Figures 5, 6:
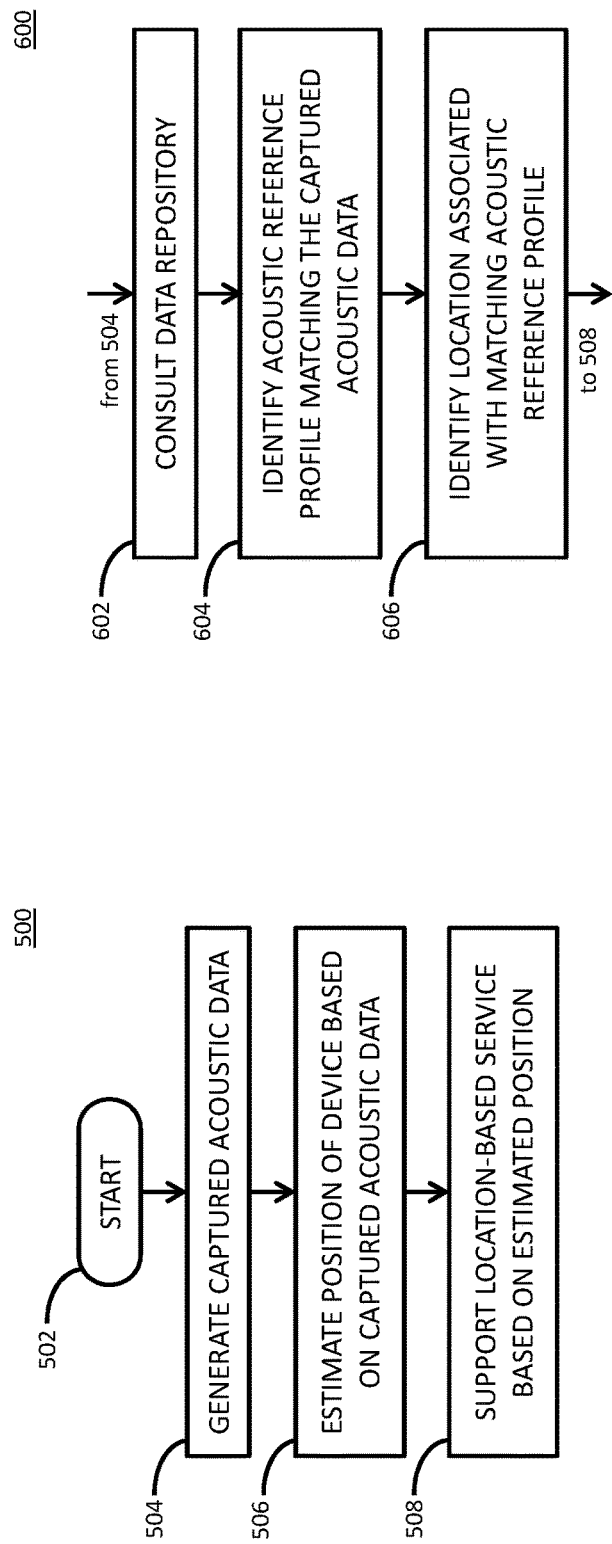
FIG. 5 is a flow chart illustrating an exemplary process of supporting a location-based service based on captured acoustic data.
FIG. 6 is a flow chart illustrating a process of estimating a location of a device within an environment in the process shown in FIG. 5, according to one embodiment.

Referring to FIG. 5, a process 500 of supporting a location-based service is based on captured acoustic data (e.g., generated as exemplarily described above).

In one embodiment, the process 500 can be initiated at 502, in response to input provided by a user of the device 100 (e.g., via a user input component 206). For example, a user can engage with the device 100 (e.g., via a user input component 206 such as a touch-screen display, microphone, camera, etc.) to launch a computer-implementable location-based service such as a map service (e.g., to inform the user as to their location within the environment), a navigation service (e.g., to inform the user as to how to navigate within the environment), a directory service (e.g., to provide the user with information relating to nearby objects, people, sales, services, etc.), or the like or any combination thereof.

In another embodiment, however, initiation at 502 can be responsive to signals received via the communication module 204. For example, the process 500 can be initiated upon receiving a signal (e.g., an RF signal transmitted from a device associated with a building, venue, automobile, etc.) through a communications channel (e.g., established through WiFi, WiMax, Zigbee, RFID, NFC, Bluetooth, Bluetooth Low Energy, etc.). The RF signal can indicate the presence of an RF transmitter (e.g., an iBeacon, etc.), a wireless router, a wireless access point, or the like or any combination thereof.

In yet another embodiment, initiation at 502 can be responsive to one or more signals captured by one or more auxiliary sensors 212. For example, a light-based signal may be generated by a pulsating light source (e.g., an LED light source) in a manner that can be captured by a light sensor or camera associated with the device 100 (e.g., via an optical communications channel established through a technology such as LiFi). LiFi is also known as Li-Fi or light fidelity, a visible light communications system using light from LEDs as a medium to communicate in a similar manner as WiFi. The optical communications channel may also be provided as exemplarily described in any of U.S. Patent App. Pub. No. 2013/0195273 and U.S. patent application Ser. No. 13/888,939, each of which is incorporated herein by reference. In another example, a sound-based signal may be generated by a modulating sound emanating from a sound source (e.g., a loudspeaker) in a manner that can be captured by a microphone associated with the device 100 (e.g., via an audio communications channel provided as exemplarily described in any of U.S. Patent App. Pub. Nos. 2012/0214515 and 2012/0214544, each of which is incorporated herein by reference). In the examples provided above, a signal to be captured by an auxiliary sensor 212 is a signal that introduces information into the environment, in which certain ambient conditions related to lighting, sounds, smells, etc., may already exist. In another example, however, certain characteristics inherent in ambient lighting, sounds, smells, etc., in the environment can be considered as a characteristic "fingerprint" signal that can be captured by one or more auxiliary sensors 212.

In still another embodiment, the process 500 can be initiated when the device 100 is within a predetermined range (e.g., 10 m or less) from a "trigger location," as may be determined via GPS or one or more other proximity-detection techniques involving WiFi, Bluetooth, Bluetooth Low Energy, sound (e.g., as exemplarily described in U.S. Patent App. Pub. Nos. 2012/0214515 and 2012/0214544), or the like or any combination thereof.

To conserve the amount of power consumed by the device 100, one or more or all of the acoustic vector sensors may, by default, be placed in a deactivated state unless the process 500 is initiated. Once the process 500 is initiated, one or more or all of the acoustic vector sensors are activated to capture one or more vector components of sound propagating within the environment 102 at the device 100. In another embodiment, however, one or more or all of the acoustic vector sensors may be activated (and deactivated) manually by the user, or be maintained in an "always-on" mode (in such case, the user can—at some point—turn on the device 100 and authorize this always-on functionality).

Once the process 500 is initiated, the device 100 is operated (e.g., in the manner described above with respect to FIGS. 1 to 4B) to generate the aforementioned captured acoustic data, as shown at 504. Generation of the captured acoustic data may be initiated manually (e.g., by the user engaging with a user input component 206 of the device 100), or may be initiated automatically (e.g., upon initiation of the process 500).

In one embodiment, before processing acoustic vector signal(s) generated by the acoustic vector sensor(s), an output component 208 (e.g., a loudspeaker) associated with the device 100 is driven to emit a sound signal having characteristics (e.g., amplitude, frequency, etc.) enabling the sound signal to be reflected, refracted or diffracted by one or more objects within the environment 102 (i.e., to create one or more sound sources within the environment 102. The sound signal can be characterized as having one or more frequencies in a range from 0.1 Hz to 20 kHz (or thereabout). It will be appreciated, however, that the sound signal need not be generated by an output component 208 associated with the device 100. For example, the sound signal may be generated by a user of the device 100 (e.g., as a sound generated upon a user's cough, yelp, whistle, etc., or by user's clapping of hands, stomping of feet, etc.), by another output component not associated with the device 100, or the like or any combination thereof. In particular, the sound signal may be generated by the mobile device to produce a click or chirp that is detected upon reflection from the environment. The sound-field recovered then contains information about the surrounding structure (position and orientation of walls, for example). Likewise, emitters of this click or chirp signal may be positioned in a room or area to "illuminate" a scene with synthetic sound, which the mobile device captures and uses to construct sound fields as described herein.

The captured acoustic data generated at 504 is used to estimate the position of the device 100, as shown at 506. As used herein, the "position" of the device 100 can refer to a place where the device 100 is located (also referred to as the location of the device 100, the device's location, etc.), to the particular way in which the device 100 is arranged (also referred to as the orientation of the device 100, etc.) relative to one or more sound sources within the environment 102 (or relative to any other suitable or desirable frame of reference). An exemplary process of estimating the location of the device 100 is described with respect to FIG. 6, while an exemplary process of estimating an orientation of the device 100 is described with respect to FIG. 7.

Generally, the captured acoustic data used to estimate the position of the device 100 is at 506 represents acoustic conditions associated with sound sources that are stationary (or at least substantially stationary) relative to the environment 102. Examples of common stationary sound sources include televisions, refrigerators, heating, ventilation and air conditioning (HVAC) ducts and outlet vents, building-integrated loudspeakers, etc. Examples of non-stationary (i.e., moving) sound sources can include cars being driving down a road, friends walking together while having a conversation, etc.

To ensure that the captured acoustic data used at 506 represents acoustic conditions associated with stationary sound sources, the acoustic vector signals output by one or more of the acoustic vector sensors can, in one embodiment, be monitored (e.g., for a period in a range from 1 second to 15 seconds, or thereabout) to detect changes indicative of a change in the DOA of a propagating sound wave. Acoustic vector signals indicative of changes in DOA of propagating sound waves are thus not processed at 504 to generate the captured acoustic data. In the scenario outlined above, the device 100 is stationary (or at least substantially so) while acoustic vector signals are being generated. Thus a change in DOA is indicative of a change in position of a moving sound source relative to the environment 102.

In use, however, it is possible that the device 100 can be moving (e.g., a user holding the device 100 may be walking, riding in a moving car, etc.) while the acoustic vector signals are generated. As a result, a change in DOA of a sound wave may be indicative of a change in position of a moving sound source relative to the environment 102 (which should not be processed into the captured acoustic data used at 506), or may be indicative of a change in position of a stationary sound source relative to the device 100 (which can be beneficially processed into the captured acoustic data used at 506). To ensure that the captured acoustic data used at 506 represents acoustic conditions associated with stationary sound sources, detected changes in the acoustic vector signals, which are indicative of a change in DOA, are correlated with auxiliary sensor data describing motion of the device 100 (also referred to herein as "motion data"). Motion data corresponds to stimulus sensed by one or more auxiliary sensors 212 such as a magnetometer, a gyroscope, an accelerometer, a tilt sensor, a motion tracking camera, a depth sensor, a pressure sensor, a camera, etc. Pressure sensors used in mobile devices (namely, mobile phones) can provide a resolution of about 5 cm vertical elevation change to provide an elevation for the mobile device, from which motion due to changes in elevation may be ascertained. An acoustic vector signal, indicative of a change in DOA of a propagating sound wave, and that does not sufficiently correlate with the motion data, is not processed at 504 to generate the captured acoustic data. The act of correlating an acoustic vector signal with motion data can be regarded as an act of calibrating the acoustic vector signal with the motion data.

1. Discerning Device Location

Referring to FIG. 6, a process 600 of estimating or otherwise determining a location of the device 100 initially operates on the captured acoustic data generated at 504. The location of the device 100 can be estimated by consulting one or more databases or any other data store (hereinafter collectively referred to simply as a "data repository") to identify an acoustic reference profile that sufficiently matches the captured acoustic data, as shown at 602. The data repository may be locally accessible from the memory module 202 and/or remotely accessible by the device 100 (e.g., via communication module 204) from a remote server (not shown).

Generally, an acoustic reference profile describes one or more current, typical, historical, or expected acoustic conditions associated with an environment. Acoustic conditions described by the acoustic reference profile can include any of the aforementioned acoustic conditions described by the captured acoustic data. Within the data repository, each acoustic reference profile is indexed by location. In one embodiment, the location refers to a physical location (e.g., described using information such as geographic coordinates, a country, a county, a city, a zip code, a street address, or the like or any combination thereof). In another embodiment, the location can refer to a semantic location. For example, a semantic location can be relatively generally described as "building", "road", "park", "vehicle," etc., or can be described at one or more levels of specificity. For example, a "building" can be semantically described at one level of specificity as "home," "office," "restaurant", "store," "airport," etc., "vehicle" can be semantically described at one level of specificity as "truck," "car," "airplane," "train," etc., etc. A location can be further semantically described at another level of specificity. For example, "restaurant" can be semantically described at one level of specificity as "coffee shop," "fast-food restaurant," etc., "store" can be further semantically described at another level of specificity as "bookstore," "grocery store," "department store," etc., etc.

Further, semantic locations can be described to differentiate between locations that might otherwise be described by the same semantic location. For example, semantic locations such as "MC DONALD'S" and "CARRABBA'S" might be used to differentiate between two locations that could otherwise both be semantically described as "restaurant" semantic locations such as "MACY'S" and "NORDSTROM'S" might be used to differentiate between two locations that could otherwise both be semantically described as "department store," semantic locations such as "Portland International Airport" and "San Francisco International Airport" might be used to differentiate between two locations that could otherwise both be semantically described as "airport," etc. Semantic locations can also be described to identify specific regions or landmarks associated with a semantically-described location. For example, a semantic location can identify a region or landmark such as "kitchen," "garage," "front door," "main entrance," "west entrance," "registration counter," "check-out counter," "frozen-food aisle," etc.

Each acoustic reference profile stored within the data repository can be indexed according to one or more of any of the types of locations described above. In addition to location, the data repository can further store one or more maps, floor plans, or other layouts associated with one or more of the locations against which the acoustic reference profiles are indexed.

At 604, a matching acoustic reference profile can be identified by correlating one or more of any of the acoustic conditions described by each acoustic reference profile (e.g., DOA profile, sound source arrangement, etc.) with any corresponding acoustic conditions described by the captured acoustic data. The acoustic reference profile describing the acoustic conditions having the highest overall correlation with acoustic conditions described by the captured acoustic data is thus identified as a matching acoustic reference profile.

There are variety of signal processing methods that may be employed to execute this process of correlation. One category of methods is to employ a trained classifier to detect acoustic reference profiles. Machine learning methods, such as SVM or CNN may be used to implement the trained classifier. In one embodiment, a trained CNN is used to find matches of sound sources of a training set. One CNN may be trained to identify a particular source or sources, while others may be trained to identify the acoustic profile of a room or location. In the latter case, for example, the training set is comprised of sound fields captured from a location.

In one embodiment, one or more of the acoustic reference profiles stored in the data repository can also be indexed according to one or more items of device-supplied supplemental information, such as exemplarily described above. In such an embodiment, a matching acoustic reference profile can be identified as the acoustic reference profile that not only describes acoustic conditions that are most closely correlated with those described by the captured acoustic data, but that also is associated with one or more items of device-supplied supplemental information that most closely correlate with one or more corresponding items of device-supplied supplemental information appended to the captured acoustic data.

The location associated with the matching acoustic reference profile is then identified, as shown at 606, as an estimate of the location of the device 100 when one or more acoustic conditions described by the captured acoustic data were recorded. Depending on the granularity with adjacent locations are stored in the data repository, the aforementioned process 600 can be iteratively performed to track the location of the device 100 within the environment 102 (e.g., over any suitable or desirable period of time).

Furthermore, upon identifying the location, additional sound sources discovered or identified within the location can be added to the database, to keep it up-to-date, or include newly introduced sound sources, or change weighting of sound source occurrences based on time of day (e.g. footsteps will be heard between 8 am-5 pm), or those that have not been heard for some extensive period of time (e.g. the sound source object has been removed or replaced, the squeaky door hinge oiled, etc.)

2. Discerning Device Orientation

Referring to FIG. 7, a process 700 of estimating or otherwise determining an orientation of the device 100 operates on captured acoustic data that has been generated at 504. In one embodiment, the captured acoustic data is generated at 504 continuously, periodically (e.g., every half-second, every second, every five seconds, etc.) or randomly (e.g., with a maximum time interval between sequentially-generated instances of captured acoustic data not to be less than a quarter-second, with a maximum time interval between sequentially-generated instances of captured acoustic data not to exceed 30 seconds, or the like). In another embodiment, the captured acoustic data is continuously generated at 504, and is thereafter sampled (e.g., periodically, randomly, etc.). Whether periodically (or randomly) generated or sampled, instances of captured acoustic data generated at different times are obtained, as shown at 702 and 704.

At 706, the new instance of captured acoustic data is compared with the old instance of captured acoustic data. The comparison can be made by comparing one or more of any of the acoustic conditions described by the new instance of captured acoustic data (e.g., DOA profile, sound source arrangement, etc.) with any corresponding acoustic conditions described by the old instance of captured acoustic data. Generally, the result of the comparison indicates a relationship between the compared acoustic condition(s) described by the old and new instances of captured acoustic data, which can be used to estimate an orientation of the device 100 at 706. For example, the result can indicate that there is no change between the acoustic condition(s) described by the old and new instances of captured acoustic data. In another example, the result can indicate the existence of a change in the acoustic condition(s). In a related example, the result can describe how the acoustic condition(s) described by the later-generated captured acoustic data changed relative to the earlier-generated captured acoustic data.

If the result of the comparison indicates no change in the described acoustic condition(s) then, at 708, the orientation of the device 100 is estimated to be an orientation previously associated with the old instance of captured acoustic data. If the result of the comparison indicates a change in the described acoustic condition(s) then, at 708, a dead-reckoning process can be performed to adjust the earlier-estimated orientation (e.g., via a rotation, translation, or the like or any combination thereof) based on the changed acoustic condition(s). An updated orientation is thus obtained that corresponds to the new instance of the captured acoustic data.

In one embodiment, any of the instances of captured acoustic data can be associated with auxiliary sensor data describing an orientation of the device 100 (also referred to herein as "orientation data") relative to the environment 102, the Earth's magnetic field, the Earth's gravitational field, or the like or any combination thereof. Thus, orientation data can correspond to stimulus sensed by one or more auxiliary sensors 212 such as a magnetometer, a gyroscope, an accelerometer, a tilt sensor, a motion tracking camera, a depth sensor, a camera, etc. The act of associating orientation data with an instance of captured acoustic data can be regarded as an act of calibrating that instance of captured acoustic data with the orientation data. In one embodiment, only a first-obtained instance of captured acoustic data (i.e., the instance of captured acoustic data first obtained upon initiating process 700) is directly calibrated with orientation data, and subsequently-obtained instances of captured acoustic data are indirectly calibrated with orientation data via a dead reckoning process.

The aforementioned process 700 can be iteratively performed. In one embodiment, the "new" instance of captured acoustic data obtained at 704 in a current iteration of process 700 can be set as the "old" instance of captured acoustic data obtained at 702 in a future (e.g., next) iteration of process 700. It will be appreciated, however, that the "new" instance of captured acoustic data obtained at 704 in a current iteration of process 700 need not be used in any future iteration of process 700. By iteratively performing process 700, the orientation of the device 100 within the environment 102 can be tracked (e.g., over any suitable or desirable period of time) based on captured acoustic data.

In the embodiments illustrated above, the position of the device 100 has been described as being estimated at 506 by performing only one of the processes 600 or 700. In another embodiment, however, the position of the device 100 can be estimated at 506 by performing both processes 600 and 700. Thus, both the location and the orientation of the device 100 may be estimated at 506. In another embodiment, a sequence of measured orientation location measurements, or best estimates, are filtered with time-series analysis to provide an improved estimate of orientation and position, and forward prediction of expected position and orientation, for instance using time series analysis such as a Kalman filter.

3. Examples of Location-Based Services

Referring back to FIG. 5, and as shown at 508, an action performed based on the estimated position to support a location-based service. In one embodiment, the location-based service informs the user of the device 100 as to their estimated position (e.g., via an output component 208 of the device 100 such as a display, loudspeaker, haptic actuator, or the like or any combination thereof). For example, the location-based service is operative to visually convey the device position estimated at 506 (which may include a location and/or orientation, as estimated according to processes 600 and/or 700) on a display associated with the device 100. The device position may be visually conveyed as a marker that overlays a map, floor plan, or other layout associated with the environment 102. In one embodiment, the map, floor plan, or other layout may be obtained from the data repository, or may be obtained elsewhere (e.g., from the memory module 202, from a remote data store associated with the location-based service, etc.).

It will be appreciated, however, that the location-based service may be operative to render (e.g., via at an output component 208 of the device 100 such as a display, loudspeaker, haptic actuator, or the like or any combination thereof), to the user of the device 100, any other suitable or desirable information associated with the position estimated at 506 to facilitate navigational services (e.g., by informing the user how to navigate within the environment to reach a destination, which may be specified by the user, somebody in the user's social network, somebody having a social network profile similar to the user, somebody with whom the user has recently communicated or received a communication from (or with whom the user communicates frequently or from whom the user frequently receives communications) via phone, email, text, or other messaging system as provided by iMessage, Facebook Messenger, Snapchat, WhatsApp, Tumblr, Kik, Vine, Pheed, Twitter, etc., a store owner, an advertiser, or the like or any combination thereof), advertising or promotional services (e.g., by informing the user of sales or other promotions for products and/or services that are located near the device 100), social network services (e.g., by allowing the user to "check in"), or the like or any combination thereof. Such other information may be provided from any party (e.g., others in the user's social network, purveyors of goods, store owners, advertisers, event coordinators, etc.) and may be associated with the location(s) stored in the data repository.

B. Discerning Gesture-Based User Input

Referring to FIG. 8, a process 800 of discerning gesture-based user input from captured acoustic data (e.g., generated as exemplarily described above) can be initiated in any suitable or desirable manner (e.g., as exemplarily described above with respect to act 502, shown in FIG. 5). In the embodiment illustrated in FIG. 8, however, the process 800 can be further initiated when a user engages with the device 100 to launch any service or application supported by the device 100 (e.g., media player, imagery recorder, audio recorder, web browser, calculator, game, etc.). Upon initiation, captured acoustic data is generated (e.g., as exemplarily described above with respect to act 504, shown in FIG. 5). At least two instances of captured acoustic data are thereafter obtained (as shown at 802). In one embodiment, the instances of captured acoustic data obtained at 802 were generated over a period of time (also referred to herein as a "gestural input interval") in a range from a quarter-second to five seconds, or thereabout. The instances of captured acoustic data obtained at 802 are then processed to determine whether a gesture-based user input has been provided, as shown at 804. If it is determined that a gesture-based user input has been provided then, at 806, one or more functions supported by device 100 and associated with the gesture-based user input may be initiated, ended, or otherwise controlled. Generally, a user can provide gesture-based user input in many ways. A few non-limiting examples are provided below.

1. Discerning Gesture from Device Orientation

In one example, a user can simply move or otherwise place the device 100 in a particular orientation for the duration of the gestural input interval, move or otherwise place the device 100 in a particular series or sequence of orientations during a gestural input interval, change the orientation of the device 100 in a particular way during a gestural input interval, or the like or any combination thereof. In this example, instances of captured acoustic data can be processed to estimate the orientation(s) in which the device is placed (e.g., as exemplarily discussed above with respect to FIG. 7). If the estimated device orientation(s) correspond to device orientation(s) associated with a predetermined gesture-based user input (e.g., stored in the memory module 202) then, at 806, one or more functions of the device 100 are controlled in accordance with the predetermined gesture-based user input.

2. Discerning Gesture from Perturbation in Acoustic Condition

In another example, a user can move an object that does not, by itself, generate a sound (e.g., the user's head, arm, hand, a book, a ball, a spoon, a spatula, etc.) between a sensing location of the device 100 and a sound source propagating a sound wave toward the sensing location (e.g., in a particular direction, along a particular path, at a particular speed, or the like or any combination thereof) during the gestural input interval. When an object (e.g., the user's head, arm, hand, a book, a ball, a spoon, a spatula, etc.) passes between a sensing location of the device 100 and a sound source propagating a sound wave toward the sensing location, the object tends to absorb, reflect, diffract or otherwise affect at least a portion of the sound wave that would otherwise arrive (unaffected by the object) at the sensing location of the device 100. As a result, one or more acoustic conditions (e.g., DOA profile, sound source arrangement, etc.) described by sequentially-obtained instances of captured acoustic data, which would otherwise remain static (or at least substantially so) from one instance of captured acoustic data to another, can be momentarily perturbed. Accordingly, in this example, instances of captured acoustic data can be processed to estimate the manner in which one or more acoustic conditions described in the captured acoustic data are perturbed. If the estimated perturbation corresponds to a perturbation associated with a predetermined gesture-based user input (e.g., stored in the memory module 202) then, at 806, one or more functions of the device 100 are controlled in accordance with the predetermined gesture-based user input.

Generally, instances of captured acoustic data used to estimate a perturbation in acoustic condition(s) at 804 describe acoustic conditions associated with sound sources that are stationary (or at least substantially stationary) relative to the environment 102. To ensure that captured acoustic data processed at 804 describe acoustic conditions associated with such stationary (or at least substantially stationary) sound sources, acoustic vector signals generated by one or more of the acoustic vector sensors can be monitored, processed and/or correlated as exemplarily described above with respect to act 506, shown in FIG. 5.

Also if the device is moving while the gesture is being captured from perturbation (or movement of the sound source (see next section)) the change in device orientation is estimated (including using additional sensors, gyroscope, compass, etc.) to compensate for change in device attitude during tracking and measuring the sound perturbation or movement.

3. Discerning Gesture from Sound Source Movement

In yet another example, an object can be provided that generates sound (e.g., continuously, intermittently, or the like or any combination thereof), and a user of the device 100 can move the sound-generating object (e.g., to a particular location, along a particular direction or path, at a particular speed, or the like or any combination thereof) relative to the device 100 during the gestural input interval. Examples of sound-generating objects that may be used include a beacon (e.g., generating sounds in the ultrasonic or human-audible frequency ranges, etc.), a radio, a telephone, a portable digital media player, an electric toothbrush, etc. Instead of moving a sound-generating device, a user can simply generate sounds (e.g., at particular locations, along a particular direction or path, at a particular speed, or the like or any combination thereof) by clapping hands, snapping fingers, tapping a desk, wall, chair, etc., whistling, yelping, talking, humming, etc. Regardless of how the sounds are generated, or what is generating them, instances of captured acoustic data can be processed to estimate the manner in which the source of such sounds move during the gesture input interval (e.g., based on the DOA profile, the sound source arrangement, etc., described in each instance of captured acoustic data). If the estimated sound source movement corresponds to a movement associated with a predetermined gesture-based user input (e.g., stored in the memory module 202) then, at 806, one or more functions of the device 100 are controlled in accordance with the predetermined gesture-based user input.

Generally, instances of captured acoustic data used to estimate movement of a sound source at 804 describe acoustic conditions that are not associated with stationary sound sources such as those described above. To ensure that captured acoustic data processed at 804 describe acoustic conditions associated with such sound sources that are not stationary, acoustic vector signals generated by one or more of the acoustic vector sensors can be monitored, processed and/or correlated in a similar manner as exemplarily described above with respect to act 506, shown in FIG. 5. In the current example, however, and when motion data indicates that the device 100 is stationary, only acoustic vector signals indicating a change in DOA are processed at 504 to generate the captured acoustic data. Likewise, and when motion data indicates that the device 100 is moving, only an acoustic vector signal indicative of a change in DOA of a propagating sound wave that does not sufficiently correlate with the motion data, is processed at 504 to generate the captured acoustic data.

4. Additional Comments Regarding Gestures

As exemplarily described above, gesture-based user input can be discerned by estimating (at 804) the presence of particular acoustic conditions, particular changes in acoustic conditions, etc., that are associated with orientation of the device 100, movement of the device 100, movement of sound sources relative to the device 100, or the like or any combination thereof. In use, however, it is possible that the device 100 can be moving or otherwise oriented within an environment 102 in a manner that inadvertently and/or undesirably causes a gesture-based user input to be invoked.

To prevent such inadvertent and/or undesirable invocation of a (or any) gesture-based user input, the aforementioned orientation data and/or motion data can be monitored to determine whether the device 100 is experiencing a predetermined "gesture-disabling event." A gesture-disabling event can occur when the device 100 is moving, when the device 100 is moving in a particular manner (e.g., in a particular direction, along a particular path, at a particular speed, etc.), when the device has been moving (in any manner or in a particular manner) for a particular period of time, when the device 100 is oriented in a particular manner, when the device 100 has been oriented in a particular manner for a particular period of time, or the like or any combination thereof.

If the device 100 is determined to be experiencing a gesture-disabling event, then any acts associated with process 800 may be paused or otherwise stopped (or the process 800 may be prevented from being initiated) until it is determined that the device 100 is not experiencing a gesture-disabling event. In another embodiment, if the device is determined to be experiencing a gesture-disabling event, the process 800 may continue to run, but is altered such that no determination is made as to whether any estimated device orientation(s), perturbation(s) in acoustic condition or sound source movement estimated at 804 correspond to a predetermined gesture-based user input. In such an embodiment, the process 800 can resume as described above when it is determined that the device 100 is not experiencing a gesture-disabling event.

C. User Input Informed by User Knowledge of Acoustic Condition(s)

Figure 9:
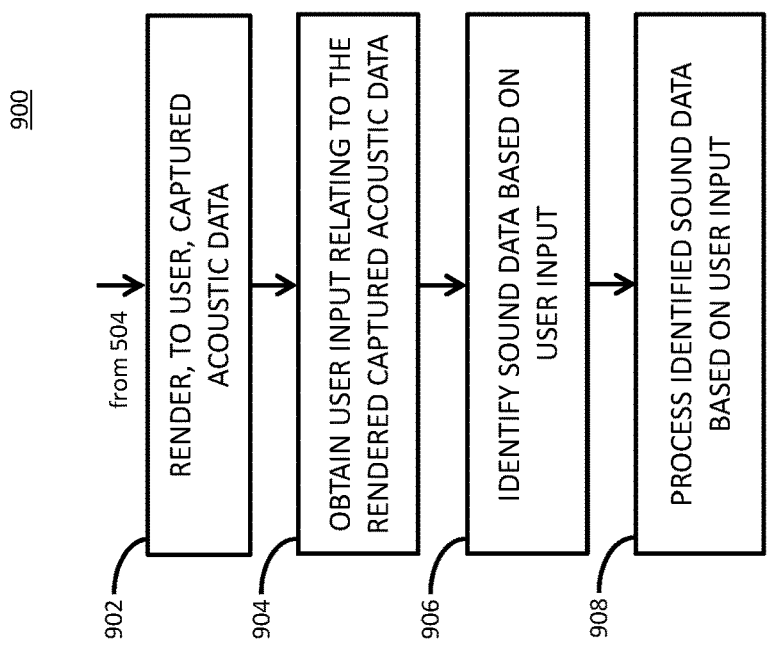
FIG. 9 is a flow chart illustrating a process of controlling device operation based on user input informed by knowledge of acoustic conditions, according to one embodiment.

Referring to FIG. 9, a process 900 of controlling an operation of the device 100 can be initiated in any suitable or desirable manner (e.g., as exemplarily described above with respect to act 502 as shown in FIG. 5, as described above with respect to FIG. 8, or the like or any combination thereof). Upon initiation, captured acoustic data is generated (e.g., as exemplarily described above with respect to act 504, shown in FIG. 5) and subsequently rendered to the user, as shown at 902, via an output component 208 associated with the device 100. By rendering the captured acoustic data, a user of the device 100 can be informed of one of more acoustic conditions associated with the environment 102.

In one embodiment, the captured acoustic data is rendered to the user via a display associated with the device 100. For example, and with reference to FIG. 10, a user of a device such as the smartphone 400 shown in FIG. 4 can launch an imagery recorder service or application. Upon launch, imagery from a scene within the field of view of a camera (e.g., camera 428) is captured and visually conveyed via a display (e.g., touchscreen display 418) as displayed imagery 1000. As is known, the captured imagery may also be stored (e.g., within one or more components of memory module 202).

Captured acoustic data derived from acoustic vector signals generated contemporaneously with the capturing of the imagery is rendered at the touchscreen display 418. By rendering captured acoustic data, one or more acoustic conditions associated with sound sources in the captured scene (and, thus, visually conveyed in the displayed scene 1000), as well as sound sources outside the captured scene, can be visually conveyed at the touchscreen display 418. Generally, the rendered captured acoustic data is derived from acoustic vector signals that were generated by acoustic vector sensors having a sensing range that overlaps the field of view of the camera from which the captured imagery is obtained (in this case, the field of view of camera 428). For example, in the illustrated embodiment, the captured acoustic data can be derived from acoustic vector signals generated by one or more acoustic vector sensors arranged at sensing locations such as 406, 408, 410, 412, 414, 416 or the like or any combination thereof.

In another embodiment, the rendered captured acoustic data can also be derived from acoustic vector signals that were generated by acoustic vector sensors having a sensing range that do not overlap the field of view of the camera from which the captured imagery is obtained. Thus, and to continue with the example described above, the captured acoustic data can be derived from acoustic vector signals generated by one or more acoustic vector sensors arranged at sensing locations such as 402, 404, or the like or any combination thereof. By rendering such captured acoustic data, the user can be desirably provided with a more complete view of the acoustic conditions in the environment containing the captured scene.

In the illustrated example, the captured acoustic data is visually conveyed as indicia (e.g., dashed circles 1002 and 1004) overlaid on the imagery 1000, wherein the location of the conveyed indicia 1002 and 1004 in the captured imagery 1000 corresponds to the location of sound sources within the captured scene (e.g., a person talking, as indicated by indicia 1002; and a bird chirping in a tree, as indicated by indicia 1004). It will nevertheless be appreciated that the captured acoustic data can be visually conveyed in any other suitable or desirable manner. To ensure that the rendered captured acoustic data is suitably or desirably registered with the displayed imagery 1000, acoustic sensors having sensing ranges that overlap with the field of view of the camera capturing the imagery (e.g., camera 428) can be calibrated according to the configuration of the camera.

In one implementation employs both a trained CNN for images and a CNN for spatial audio. The CNN trained for images identifies image objects of the image training set. The CNN trained for spatial audio identifies sound features of the sound field training set. Layers of the CNN are combined to share feature identification information for co-located features. Each of the image and sound field classifiers aids the other in object identification, and identification of scene (which at a higher level is a composite of objects that the scene is comprised of).

In one embodiment, the acoustic conditions that can be visually conveyed to the user correspond to all types of acoustic conditions (e.g., sound source arrangement, sound pressure profile, sound intensity profile, spectral content profile, etc.), and any relevant range of any type of acoustic condition, that can be described by the captured acoustic data. In another embodiment, however, the type and range of acoustic conditions that are visually conveyed can be set based on the manner in which the process 900 is initiated, based on user preferences, etc. User preferences can be obtained in any suitable manner. For example, user preferences can be obtained by presenting a set-up screen via the touchscreen display 418 that enables a user to select which types of acoustic conditions to visually convey and, optionally, to further specify threshold value(s) that each selected type of acoustic condition should meet before the selected type of acoustic condition is enabled to be visually conveyed. Thus, to continue from the example illustrated in FIG. 10, other sound sources may be present within the captured imagery (e.g., a chattering squirrel on the trunk of the tree in the displayed imagery 1000), but only acoustic conditions associated with sound waves having a sound pressure, sound intensity, spectral content, etc., that correspond to human speech and bird songs have been set to be visually conveyed.

Figure 10:
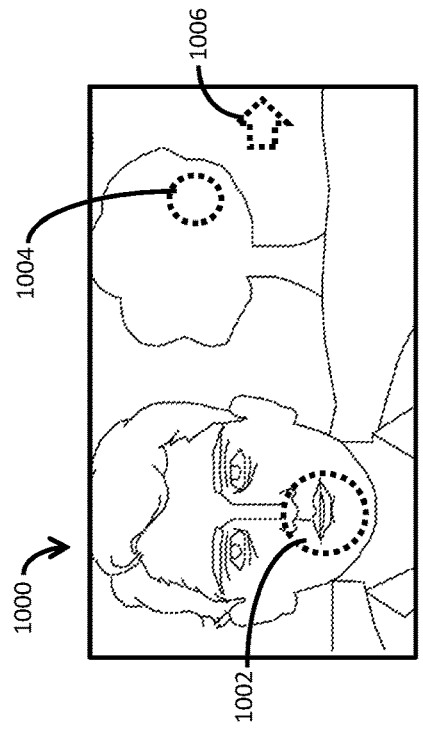
FIG. 10 illustrates an example of displayed imagery that may be conveyed to a user during the process shown in FIG. 9.

Although FIG. 10 illustrates an example in which acoustic conditions associated with sound sources in the captured scene are visually conveyed at the touchscreen display 418, it will be appreciated that captured acoustic data can be rendered to inform the user of acoustic conditions that are not associated with sound sources in the captured scene. For example, as illustrated in FIG. 10, captured acoustic data can be visually conveyed as indicia (e.g., a dashed arrow 1006) overlaid on the imagery 1000, wherein the conveyed indicia 1006 indicates that one or more sound sources are located outside the captured scene (e.g., a running gasoline lawnmower). If the user moves the smartphone 400 (e.g., along the direction of the arrow 1006) such that the lawnmower is now in the captured scene, captured acoustic data now visually conveys indicia (e.g., a dashed circle overlaid on the captured imagery 1000 at a location corresponding to the location of the lawnmower within the newly-captured captured scene.

Although captured acoustic data has been described above as being rendered via a display, it will be appreciated that captured acoustic data can be rendered via other output components 208 such as one or more loudspeakers, one or more haptic actuators, or the like or any combination thereof. For example, the captured acoustic data can be audibly rendered via a loudspeaker (e.g., loudspeaker 422) as one or more beeps, alarms, or other audio signatures characterized by different frequencies, amplitudes, etc. Likewise, in another embodiment, the captured acoustic data can be haptically rendered via a haptic actuator as one or more haptic signatures characterized by different patterns, durations, intensities, etc. In one embodiment, the audio and haptic signatures can vary depending on the location of the sound source within the captured imagery 1000 (e.g., so as to become more perceptible to the user as the sound source is moved toward the center of the captured imagery 1000, to become less perceptible to the user as the sound source is moved away from the center of the captured imagery 1000, etc.). In another embodiment, the audio and haptic signatures can vary depending upon the acoustic conditions associated with the sound source within the captured imagery 1000, or the like or any combination thereof.

Further, and similar to visually-conveyed indicia 1006, the captured acoustic data can be audibly or haptically conveyed to indicate that one or more sound sources are located outside the captured scene (e.g., the running gasoline lawnmower). Thus, to continue from the example illustrated in FIG. 10, captured acoustic data can be audibly rendered via a set of headphones or earbuds worn by the user as an audio signature indicating that a sound source is located to the right of the captured scene. The audio signature may simply be a statement indicating that a sound source is located to the right of the captured scene, or may selectively play a sound to the user's right ear. Likewise, captured acoustic data can be haptically rendered via a set of haptic actuators embedded within the device (or some other device or set of devices worn on the user's arms, legs, head, etc.) such that a haptic signature is selectively rendered on the right side of the device 400 (or, otherwise, on the right side of the user's body).

Returning back to FIG. 9, at 904, user input relating to the rendered captured acoustic data is obtained when the user interacts with the device 100 via one or more input components 206. In one implementation, the user can interact with the device 100 by engaging an input component 206 thereof to indicate a selection of one or more sound sources represented by the rendered captured acoustic data. Selection of a sound source can represent an instruction to perform some operation in connection with sound data corresponding to the sound source. Examples of operations that can be performed include a recording operation to store the sound data, a pre-recording processing operation to enhance, degrade, suppress, etc., the sound data before it is stored, a muting operation to prevent the sound data from being stored, etc. In the illustrated embodiment, user interaction is accomplished by touching the touchscreen display 418 of the smartphone 400 (e.g., at a location corresponding to indicia 1002, to indicate the talking person as a selected sound source). The user can select the operation to be performed in connection with the selected sound source in any suitable manner. For example, in the illustrated embodiment, the user can iteratively cycle through operations that can be performed by repeatedly touching the touchscreen display 418 (e.g., at a location corresponding to indicia 1002). Confirmation of a sound source selection and/or of an operation to be performed can be made via one or more output components 208 (e.g., by changing a color, size, shape, etc., of the indicia the user touched, by displaying other indicia, by playing a sound, by rendering a haptic effect, or the like or any combination thereof).

Upon obtaining user input indicating which sound sources have been selected by the user, the sound associated with each selected sound source is identified, as shown at 906. Generally, sound identification can be accomplished by first identifying the acoustic vector sensor(s) that generated the acoustic vector signal(s) associated with the selected sound source(s). Upon identifying the acoustic vector signal(s) associated with the selected sound source(s), a determination is then made to identify any sound data that matches the captured acoustic data associated with the identified acoustic vector signal(s). As mentioned above, sound data describes the scalar component of a sound wave incident on the device, whereas captured acoustic data describes the vector component of an incident sound wave. Thus, matching sound data can be identified by temporally correlating acoustic conditions described by the sound data (e.g., sound pressure, etc.) with one or more acoustic conditions described by captured acoustic data. Sound data having the highest temporal correlation with the captured acoustic data can be identified as matching the captured acoustic data that corresponds to the user input obtained at 904. Thereafter, at 908, the matching sound data is processed based on the user input obtained at 904.

VI. Other Interactions Between Acoustic Vector Sensors and Auxiliary Sensors In the embodiments discussed above, activation of an acoustic vector sensor (as well as the generation of captured acoustic data) can be based on the initiation of a process, such as process 500, 800 or 900. In other embodiments, however, the activation or deactivation of any acoustic vector sensor, or of any set of acoustic vector sensors (as well as the generation of captured acoustic data based on any acoustic vector signals) can, for any purpose, be based on the orientation of the device 100 (e.g., as sensed by one or more auxiliary sensors 212 such as an accelerometer, a magnetometer, a gyroscope, etc.), be based on the location of the device 100 (e.g., as sensed by an auxiliary sensor 212 such as a GPS sensor, etc.), be based on the time of day, be based on a response to one or more signals captured by one or more auxiliary sensors 212 (e.g., as discussed above with respect to act 502), be based on a response to one or more signals received via the communication module 204 (e.g., as discussed above with respect to act 502), be based on the proximity of the device 100 from a "trigger location" (e.g., as discussed above with respect to act 502), or the like or any combination thereof.

VII. Additional Embodiments

Above, we described applications of sound fields generated from acoustic vectors. In this section, we illustrate additional embodiments.

Figure 11:
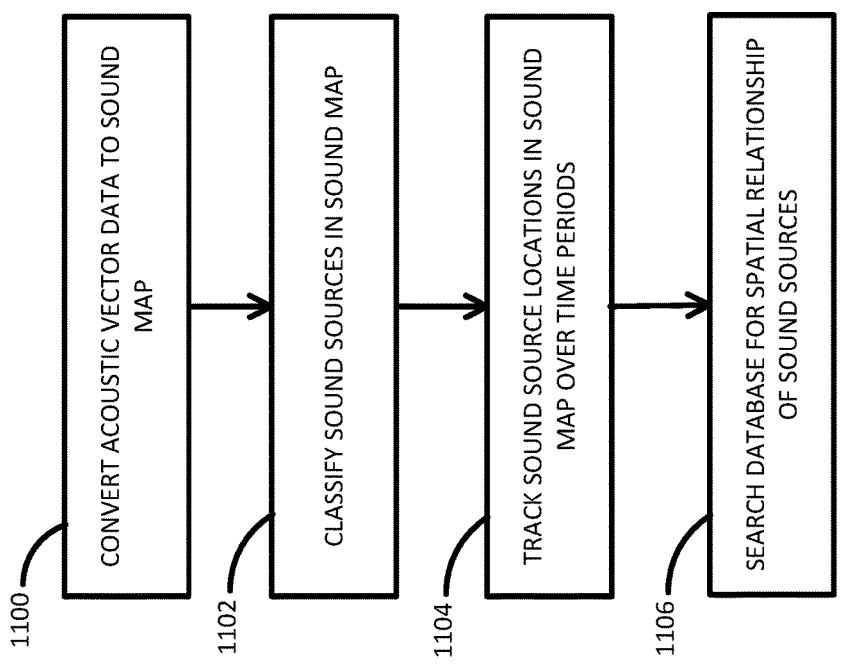
FIG. 11 is a flow chart illustrating a process of identifying and tracking sound sources in sound map from acoustic vector data sensed on a device.

FIG. 11 is a flow chart illustrating a process of identifying and tracking sound sources in a sound map from acoustic vector data sensed on a device. This embodiment uses a classifier to identify and locate sound sources in a sound map. This enables the sound sources to be tracked over time, which provides an estimate of the spatial relationship of the sound sources relative to the sensing device. This spatial relationship, in turn, is used to query a database to access metadata associated with the environment in which the sound field has been sampled.

At 1100, a processor converts acoustic vector data into a sound map. In this process, the processor receives acoustic vector sensor output from plural axes of an acoustic vector sensor configuration, preferably orthogonal, over a sampling period. This mapping resolves the sound data from each axes into plural directions of arrival, creating the sound map. Examples of the mapping methods are detailed in this document.

At 1102, a processor executes a trained classifier on the sound map. The classifier is trained on labeled sound maps of sound sources. In a preferred embodiment, the classifier is a trained CNN, but other forms of classifiers may be employed as alternatives, e.g., SVM, Recurrent Neural Networks, etc. The classifier output provides a source ID for each of the likely identified sources in the sound map, along with a location of each identified sound source in the sound map.

At 1104, a processor executes a tracking process. Prior to this process, a classified sound maps are generated from different time periods of sampling sound in a particular environment. This is accomplished by execution of 1100 and 1102 for each of the time periods. For mobile devices, like a smartphone or VR headset, the sensing device is moving within this environment over these different time periods. The tracking process performs a correspondence matching in which common sound sources of the sound maps from different time periods are matched. Once matched, the position of sound source in the sound map is tracked from one period to another. A preferred approach is to employ bundle adjustment, in which the feature positions being tracked are the sound source locations in the sound maps for each period. Through this process of 1104, the identity and spatial relationship of sound sources is obtained.

This sound source identity and spatial arrangement may be used for various applications. One application, illustrated in 1106 of FIG. 11, is to query a sound field database of spatial arrangements of identified sound sources. The database search identifies a likely match or matches for the query and returns associated metadata. One type of metadata is a location, such as the location within a room, building, or a geolocation (e.g., a landmark, city location, or the like). Additional metadata includes other information about the environment in which the sound field has been detected, such as imagery of the environment, graphical depictions of the sound sources, etc.

Another application is to employ the sound source identities and spatial relationship to render a graphical depiction of the surrounding acoustic environment. Graphical features associated with the sound sources are fetched from a local data store or remote database, and rendered in an image for display on the user's device, at a location within the image corresponding to the location of the sound source.

Figure 12:
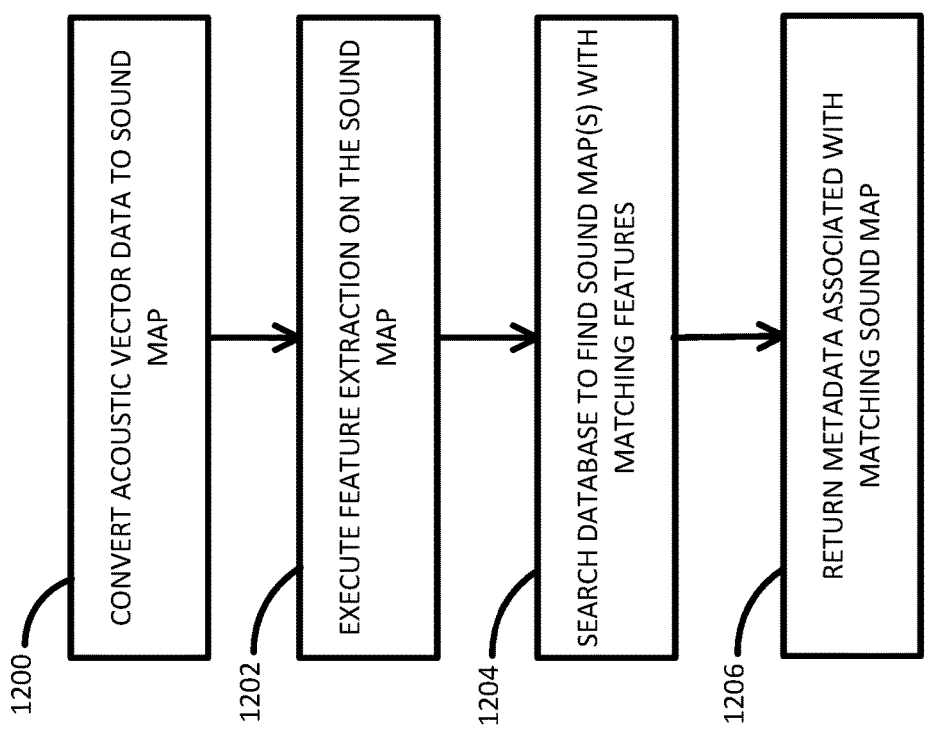
FIG. 12 is a flow chart illustrating a process retrieving metadata associated with a sound map based on extracted sound features.

FIG. 12 is a flow chart illustrating a process of retrieving metadata associated with a sound map based on extracted sound features. In this process, the acoustic vector sensor data is converted into a sound map as described above for 1100 in FIG. 11. Rather than execute a classifier to extract and identify features, this process executes feature extraction at 1202 on the sound map. The sound map forms a discrete sound image in which each element corresponds to direction into which the acoustic vectors from the plural axes are resolved. At each element, the sound over the sampling period may be converted to a spectral representation (e.g., via FFT, subband filtering, etc.). Features are extracted from the sound map, for example, using SIFT or SURF features, or alternative features such as spectral peaks from a spectral data at element locations within the sound image.

At 1204, a processor executes a search of a feature database to find a matching sound map. The database is constructed by hashing and sorting the hashed sound map features that have been captured and recorded for locations (e.g., in a data gathering process of sound maps at indoor locations or geolocations). In this case, the extracted features are likewise formatted into a hash, which in turn, is used to look up a matching sound image based on its extracted features.

In 1206, the database returns metadata associated with the matching sound image. This metadata, as in the process of FIG. 11, provides information about the environment from which the sound field has been captured, such as a location (indoor location on a map, or geolocation), imagery from the environment, etc.

Figure 13:
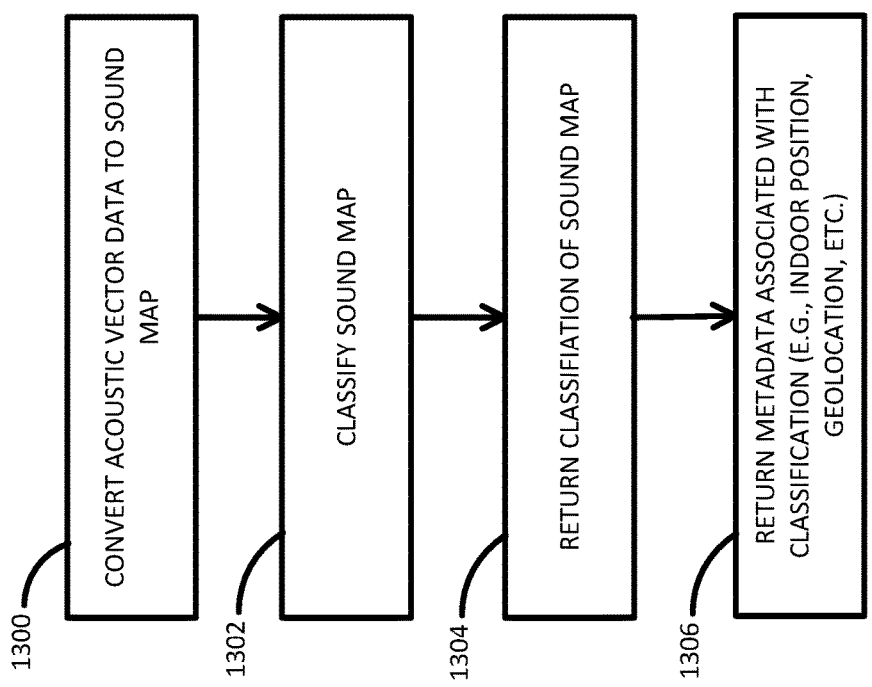
FIG. 13 is a flow chart illustrating a process of classifying a sound map to provide location information.

FIG. 13 is a flow chart illustrating a process of classifying a sound map to provide a classification of location. In this variant, a classifier is trained with sound maps labeled by location. Several sound maps are captured for each location, tagged with location of capture, and then submitted to the training process, which generates a classifier that classifies a sound map by its likely location.

At 1300, acoustic vector data is converted into a sound map in a similar manner at 1100 and 1200 from FIGS. 11 and 12.

At 1302, the trained classifier executes to assign a classification to the sound map, which in this case, provides a likely location. A preferred embodiment is a trained CNN, but other classifiers may be employed, e.g., CNN, Recurrent Neural Networks using long short term memory (LSTM), and the like.

At 1304, the classification of the sound map is returned. In this application, the classification corresponds to the likely location where the sound map has been captured. As reflected at 1306, location is one type of metadata that is returned based on the classification. Additional metadata associated with the classification may also be returned, such as imagery of the environment.

Alternatively, the classifier may be trained to classify a sound map based on other labels of the training data set. For instance, the classifier can be trained to classify the orientation of the sensing device within a particular audio environment of sound sources.

Figure 14:
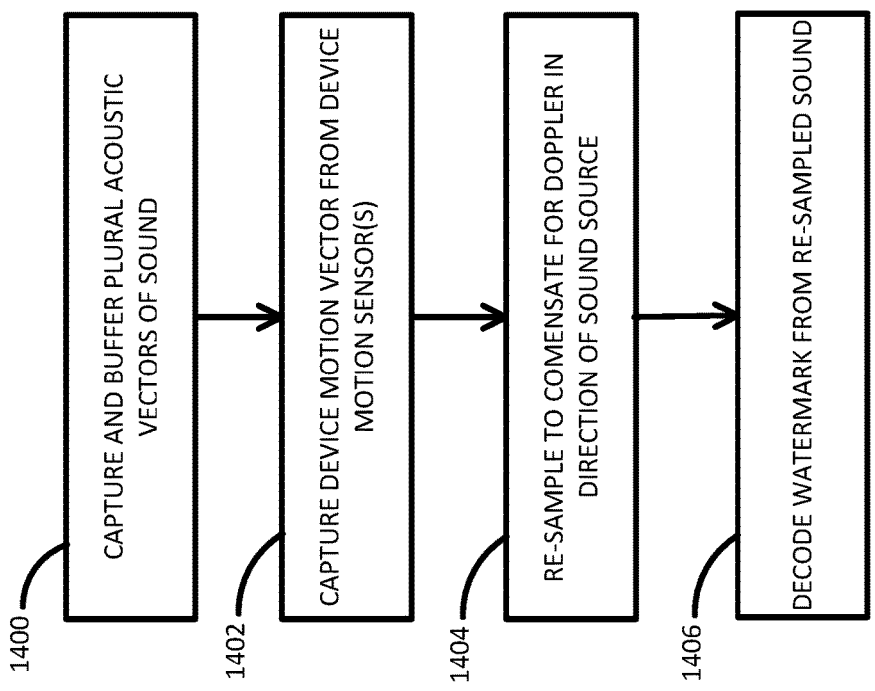
FIG. 14 is a flow chart illustrating a process of compensating for effect of motion on sound.

FIG. 14 is a flow chart illustrating a process of compensating for effect of motion on sound sensed by a mobile device. In this process, the acoustic vector data sensed by the mobile device is used to determine direction of sound sources, and the motion sensor of the mobile device provides a motion vector representing the device motion. Based on the relative direction of sound and direction of motion of the device, the process re-samples sound captured from a direction or for plural directions to compensate for the effect of device motion.

At 1400, a processor in the mobile device captures and buffers plural acoustic vectors of incoming sound. Preferably, the acoustic vector sensor configuration on the device has plural axes to capture audio from plural directions of arrival.

At 1402, a processor in the mobile device captures motion data and derives a motion vector describing direction of device motion over the audio capture period of 1400.

For a particular direction of arrival of a sound source, a processor determines the re-sampling parameters needed to compensate for device motion and re-samples sound from the sound source as shown at 1404. The device motion has Doppler effect which varies for sound sources based on the direction of device motion relative to direction of arrival from the sound source. In particular, this creates a Doppler shift in the sound from the sound source. The processor determines the extent of shift based on the component of the motion vector of the device in the direction of arrival from the sound source. It then re-samples the sound source from that direction to compensate for the Doppler shift.

One application for this compensation is to prepare the audio signal arriving from a particular sound source for audio watermark decoding as reflected at 1406. In particular, incoming watermark audio from plural different source locations is compensated with this method and submitted for audio watermark decoding. This method also applies to other forms of audio carrying data signals that are potentially impacted by Doppler distortion, such as high frequency audio signals (e.g., 18-22 kHz sensed by mobile device microphone or ultrasonic signals) modulated to carry variable data. For more details on compensating for time scaling and pitch shifting, please see provisional application 62/371,693, filed Aug. 5, 2016, entitled AUDIO WATERMARK DECODING ADAPTED TO COMPENSATE FOR TIME SCALING AND PITCH SHIFTING, which is hereby incorporated by reference. This method may be used in conjunction with decoding data signals from plural different audio sources for use in mobile device positioning as described in US Application Publication 20150168538. Audio watermarking and auxiliary data signaling is particularly described in assignee's U.S. Pat. No. 9,305,559, and published applications 20120214515, 20150168538, which are incorporated by reference. Publications 20120214515 and 20150168538 particularly describe audio signaling for mobile device positioning.

VIII. Exemplary Inventive Features

This section provides several inventive method and system configurations, and additional description.

A. A method comprising:

obtaining acoustic reference data associated with an environment, the acoustic reference data describing at least one attribute of a sound source from which sound can propagate into the environment;

capturing, during a first time period, a vector component within an acoustic field proximate to a device arranged within the environment;

processing the captured vector component of a first acoustic vector field to generate first acoustic vector data therefrom, the first acoustic vector data describing at least one attribute of an acoustic feature of the environment at the device;

comparing the first acoustic vector data with the acoustic reference data; and determining a spatial arrangement of the device based on the comparing.

A sound source can include anything from which sound emanates. A source can generate sound, reflect sound, diffuse sound, etc. Sound can be in the human auditory range of around 1 Hz to 20 kHz. Sound can range from low-frequency vibrations picked up by accelerometers (earthquake motion) through to well above human hearing range (e.g., sound from squeaking hinges and other machine parts). For example, in some applications, the methods employ ultrasonic sound sources for location beacons in the location recognition even without necessarily understanding the messages that the beacons are conveying.

In this context, a "device" can include any portable or stationary device. It may include a computing device such as a desktop computer, laptop computer, tablet computer, smartphone, a media player, wearable computer (e.g., Google Glass, Samsung Gear, etc.), game controller, game console, etc.

The "acoustic vector field" is a vector field describing a pattern of particle vibrations at acoustic frequencies within a region near the device.

The Act of "Obtaining"

A.1 The inventive method of A wherein obtaining the acoustic reference data comprises:

obtaining location data describing a location of the device;

identifying, from sets of acoustic reference data corresponding to a plurality of locations, acoustic reference data corresponding to the location described by the obtained location data; and retrieving the identified acoustic reference data.

The location data can be obtained from a GPS sensor, RFID/NFC sensor, Bluetooth antenna, WiFi antenna, user input, etc. Location can also be inferred from the observed/measured data from microphones and cameras. For example, location is inferred from images captured by the device's camera by matching the images to a database of images with associated GPS coordinates. One approach is to train a CNN with a dataset of geotagged images, e.g., those collected from Google's Streetview or Flickr.

The set of acoustic reference data can be stored locally on the device, on some remote server, or both. For CNNs, this acoustic reference-data is used to train the feature detection of a CNN, and is then not needed. The CNN configuration reduces to a minimum useful set for the application in question, such that the recognition process runs locally on the mobile device.

A.1.1 The inventive method of A.1 wherein obtaining location data comprises detecting a characteristic of the sound propagating through the environment.

The characteristic is an audio watermark, an audio fingerprint, or other spectral or temporal content of sound emanating from the acoustic source. Audio watermarking and auxiliary data signaling is particularly described in assignee's U.S. Pat. No. 9,305,559, and published applications 20120214515, 20150168538, which are incorporated by reference. Publications 20120214515 and 20150168538 particularly describe audio signaling for mobile device positioning.

A.1.2 The inventive method of A.1 wherein the sets of acoustic reference data correspond to a plurality of locations within the environment in which sound can propagate.

A.2 The inventive method of A wherein obtaining the acoustic reference data comprises:

capturing a vector component within the acoustic field proximate to the device during a second time period occurring before the first time period; and processing the vector component captured during the second time period to generate second acoustic vector data therefrom, the second acoustic vector data describing at least one attribute of an acoustic feature within the environment at the device during the second time period.

A.2.1 The inventive method of A.2 wherein processing the vector component captured during the second time period comprises performing multipath correction.

In one embodiment, the multipath correction is performed using a rake receiver.

A.2.2 The inventive method of A.2 wherein processing the vector component captured during the second time period comprises performing a feature detection process.

The feature detection process can include designed feature extractors, as in SIFT, SURF, ORB etc. It alternatively is embodied in trained classifiers, such as CNNs or SVM.

A.2.3 The inventive method of A.2 wherein processing the vector component captured during the second time period comprises processing the second acoustic vector data to identify at least one substantially stationary acoustic feature.

Acoustic features that are identified as moving (e.g., during the second time period) are filtered out in some embodiments. In others, the moving sounds remain, but the classifier labels them as non-stationary. For example, traffic on a road will have locations and directions that can be part of the sound feature map for that location, which contribute toward location correlation. In some embodiments, user motion is tracked with the motion sensor of the mobile device and subtracted.

A.2.4 The inventive method of A.2 wherein processing the vector component captured during the second time period comprises estimating a direction of arrival (DOA) of sound emanating from the acoustic feature.

The localization processes can include parametric techniques (e.g., Root-MUSIC, MUSIC, Capon, beamforming, etc. as detailed in the teachings incorporated above. Localization alternatives include continuous sound direction estimation with beamforming. As described above, certain embodiments convert the signals from an acoustic vector sensor into a sound map. One implementation of a sound map provides a sampling of the sound field at particular DOAs, or equivalent locations relative to the sensor or device frame of reference. For example, the sound map is a discrete spherical image in which the discrete sample (e.g., "pixel" of the image) is a sound arriving at the device from a DOA at a particular sampling instance or period. Each such pixel may have a temporal component over a sampling period, and further, may be converted to spectral data (e.g., via FFT of the samples at a pixel over a time period). This temporal dimension provides an added dimension to the sound map, as does the spectral data (e.g., Fourier components) per pixel.

A.2.5 The inventive method of A.2 wherein processing the vector component captured during the second time period comprises estimating at least one of a sound pressure, a sound intensity, and a frequency of sound emanating from the acoustic feature.

A.3 The inventive method of A further comprising transmitting a sound signal from the device into the environment such that the sound signal is at least partially reflected within the environment during the second time period while the second acoustic vector field is captured.

Alternatively, the sound signal can be a sound uttered or otherwise made by the user of the device (e.g., as with a snap, whistle, cough, etc.). For example, the device may be configured with a classifier (CNN, SVM, etc.) that is trained to detect particular sounds made by the user.

A.3.1 The inventive method of A.3 wherein the sound signal includes a frequency greater than 20 Hz.

As noted, the frequency of the sound may also be lower than 20 Hz.

A.3.2 The inventive method of A.3 wherein the sound signal includes a frequency less than 20 kHz.

As noted, the frequency of the sound may also be greater than 20 kHz.

A.3.3 The inventive method of A.3 wherein the sound signal is a chirp sound signal.

Alternatively, sound signal can be music played by the device, vibration sounds generated by a haptic motor on the device, etc. In each case, the device may be configured with a classifier (CNN, SVM, etc.) that is trained to detect these particular sounds.

A.3.4 The inventive method of A.3 wherein the sound signal is a coded sound signal.

Implementations of coded signals, such as digital watermarks, high frequency audio signals within the range of 19 to 22 kHz for detection on mobile devices, audio fingerprints and designed audio signals for positioning are described in assignee's U.S. Pat. No. 9,305,559, and published applications 20120214515, 20150168538, which are hereby incorporated by reference. Publications 20120214515 and 20150168538 particularly describe audio signaling for mobile device positioning.

The Act of "Capturing"

A.4 The inventive method of A wherein capturing the vector component during the first time period comprises sensing particle velocity at the device.

This method of acoustic vector field capture is implemented during the first time period, during the second time period, or both.

A.5 The inventive method of A wherein capturing the vector component during the first time period comprises sensing a pressure gradient at the device.

A.6 The inventive method of A further comprising capturing, during the first time period, a plurality of vector components within a plurality of acoustic fields proximate to the device.

A.7 The inventive method of A further comprising:
sensing sound pressure at the device during the first time period; and
correlating the sensed sound pressure with the first acoustic vector field.

Sound pressure can also be sensed during the second time period, and correlated with the second acoustic vector field.

Sound intensity can be obtained as the product of the sensed sound pressure and particle velocity.

A.8 The inventive method of A further comprising transmitting a sound signal from the device into the environment such that the sound signal is at least partially reflected within the environment during the first time period.

Alternatively, the sound signal is a sound uttered or otherwise made by the user of the device (e.g., as with a snap, whistle, cough, etc.), and detection is implemented with a classifier trained on various input of the sound captured from the user. Two examples of the classifier are a CNN and SVM type classifier.

A.8.1 The inventive method of A.8 wherein the sound signal includes a frequency greater than 20 Hz.

The frequency of the sound could be lower than 20 Hz, e.g., revealing the low frequency resonant nature of an object within the environment.

A.8.2 The inventive method of A.8 wherein the sound signal includes a frequency less than 20 kHz.

The frequency of the sound could be greater than 20 kHz. Higher frequencies (shorter wavelengths) sounds reflect better from smaller objects/surfaces than lower (hence bats, porpoises, radar). Refraction around objects/at object edges is not much use for direct detection, though it could be used with different approaches.

A.8.3 The inventive method of A.8 wherein the sound signal is a chirp sound signal.

Alternatively, the sound signal can be music played by the device, vibration sounds generated by a haptic motor on the device, etc.

A.8.4 The inventive method of A.8 wherein the sound signal is a chirp or coded sound signal.

Examples of coded sound signals include digital watermarks and other auxiliary data signals coded into audio, e.g., as described in assignee's U.S. Pat. No. 9,305,559, and published applications 20120214515, 20150168538, which are hereby incorporated by reference.

The Act of "Processing"

A.9 The inventive method of A wherein processing the vector component captured during the first time period comprises performing multipath correction.

Multipath correction can be performed using a rake receiver, etc.

A.10 The inventive method of A wherein processing the vector component captured during the first time period comprises performing a feature detection process.

The feature detection process can include SIFT, SURF, etc. or trained classifiers, such as those employing CNN or SVM.

A.11 The inventive method of A wherein processing the vector component captured during the first time period comprises processing second acoustic vector data captured during a second time period to identify at least one substantially stationary acoustic feature.

Acoustic features that are identified as moving (e.g., during the second time period) can be filtered out.

A.12 The inventive method of A wherein processing the vector component captured during the first time period comprises estimating a direction of arrival (DOA) for the acoustic feature.

The localization processes can include parametric techniques (e.g., Root-MUSIC, MUSIC, Capon, beamforming, etc. as detailed in the teachings incorporated above. Localization alternatives include continuous sound direction estimation with beamforming. As described above, certain embodiments convert the signals from an acoustic vector sensor into a sound map.

A.13 The inventive method of A wherein processing the vector component captured during the first time period comprises estimating at least one of a sound pressure, a sound intensity, and a frequency of sound emanating from the acoustic feature.

The Act of "Comparing"

A.14 The inventive method of A wherein:

the at least one attribute described by the sound reference data includes a position of the sound source and the at least one attribute described by the first acoustic vector data includes a position of the at least one acoustic feature; and comparing the first acoustic vector data with the acoustic reference data comprises comparing the described position of the sound source with the described position of the at least one acoustic feature.

A.14.1 The inventive method of A.14 wherein the first acoustic vector data describes a position of the at least one acoustic source relative to the device.

Depending on amount of pre-processing or hard-wired circuitry present, position could be determined in terms of other frames of reference.

A.14.1.1 The inventive method of A.14 wherein the acoustic reference data describes a position of the sound source relative to a frame of reference different from the device.

Alternatively, sound source position could be given relative to the device. In such a scenario, the position of the device and the sound source should be mapped to a common frame of reference.

The Act of "Determining"

A.15 The inventive method of A wherein determining a spatial arrangement of the device comprises determining the spatial arrangement of the device relative to the sound source.

A.16 The inventive method of A wherein determining a spatial arrangement of the device comprises determining the spatial arrangement of the device relative to a frame of reference independent of the sound source.

A.16.1 The inventive method of A further comprising:

receiving, from at least one auxiliary sensor associated with the device, auxiliary data describing a spatial arrangement of the device relative to the frame of reference during the first time period; and associating the first acoustic vector field with the frame of reference by correlating the auxiliary data with the first acoustic vector field.

A.16.1.1 The inventive method of A wherein the auxiliary data describes an orientation the device relative to the frame of reference.

In this case, the auxiliary sensor can include an accelerometer, gyroscope, magnetometer, RF receiver, camera etc. One or more of these auxiliary sensors provide sensor samples that are synchronized with the samples of the acoustic sensor. For example, in the case of the camera, this enables the video frames captured by the camera to be synchronized with the acoustic field, for applications in which graphical depiction of the acoustic field or features within it are superimposed on the video and rendered to the user. This employs local processing on the device, such as plural DSP, GPU or like vector processors executing processing pipelines on the sensor input in parallel.

A.16.1.2 The inventive method of A.16 wherein the auxiliary data describes a location of the device relative to the frame of reference.

In this case, the auxiliary sensor can include a GPS sensor, RFID/NFC sensor, Bluetooth antenna, WiFi antenna, etc. These devices provide location in the form of GPS coordinates, or indirectly, in the form of an identifier, that is associated with a location (e.g., GPS coordinates, or coordinates within a building, venue or room) in a database. For example, RFID, Bluetooth, or wifi device provide an ID, sensed through a corresponding sensor of the device, which the device uses to look up a location.

A.16.1.3 The inventive method of A.16 wherein the auxiliary data describes an altitude of the device relative to the frame of reference.

In this case, the auxiliary sensor can include a barometer, GPS sensor, etc.

A.17 The inventive method of A wherein determining the spatial arrangement of the device comprises determining an orientation of the device.

A.18 The inventive method of A wherein determining the spatial arrangement of the device comprises determining a location of the device.

A.19 The inventive method of A wherein determining the spatial arrangement of the device comprises determining an altitude of the device.

Additional Inventive Methods

A.20 The inventive method of A further comprising, during a third time period after the first time period:

updating acoustic reference data to correspond to first acoustic vector field;

capturing, during the third time period, a third acoustic vector field of the environment at the device;

processing the captured third acoustic vector field to generate third acoustic vector data therefrom, the third acoustic vector data describing at least one attribute of an acoustic feature within the environment at the device during the third time period;

comparing the third acoustic vector data with the updated acoustic reference data; and determining a spatial arrangement of the device based on the comparing.

A.21 The inventive method of A further comprising controlling an operation of at least one output device based on the determined spatial arrangement of the device.

The location or orientation gleaned from processing the acoustic vector sensor data is provided to mobile application programs executing in the device, e.g., by an operating system service. It may be used by applications and the operating system to complement GPS location as well as device orientation from other sensors like accelerometers, gyroscopes, magnetometers, and the like. In one application, robotic devices, such as autonomous vehicles (like a vacuum cleaner), uses both the camera and the acoustic vector sensor to detect objects and sound sources to learn its environment. Learned features are stored for future reference within the device and used to locate and orient the device.

A.21.1 The inventive method of A.21 wherein the at least one output device comprises a display.

The display can be of the LCD, LED, OLED, or QD varieties. It may also be a projector. The projector, for example, projects an image of the surrounding scene, superimposed with graphical indicators of labeled sound sources at locations in the projection that correspond to actual location in the environment. Graphical depictions may be displayed of sound sources that depict what the sounds are, particularly of objects not plainly visible, like a fan or motor hidden in a wall or ceiling, yet emitting sounds sensed by the acoustic sensor of the device.

Operation of display can be controlled to display to a user any visual indication that a sound has been detected, the estimated location of the source of the sound, the location of the device, etc.

A.21.2 The inventive method of A.21 wherein the at least one output device comprises a loudspeaker.

Operation of loudspeaker can be controlled to adjust the volume of sound currently being rendered, select a sound (or other audio program) to render, etc. One particular role of the loudspeaker, detailed in above embodiments, is to output a coded signal or chirp to aid in location and discovery of features in the environment.

The output device may also be an array of loudspeakers, which are controlled to direct sound at a particular location. The dual of beamforming of sensed audio is to beamform sound output from an array of loudspeakers to a particular region of the room in which the device is positioned. This approach of beamforming output may be used to direct sound to locations determined by analysis of the sound field, e.g., to project sound in directions toward and away from identified objects and sound sources in the environment. This approach may be used for a variety of applications. One is to improve communication by directed sound to particular locations where listeners or participants in voice or video chat are situated. Another is to mask sound, e.g., for privacy reasons or to improve the environment by masking unwanted noises. In this application, the loudspeakers direct masking sounds at a particular location detected in the sound field analysis. Another application is to improve the acoustic effects of a room, by directing sound (e.g., music or the sound track of a movie or TV show) to an area of the room where sound quality is poor or sound level is low.

A.21.3 The inventive method of A.21 wherein the at least one output device comprises a haptic actuator.

The haptic actuator can be provided as an eccentric rotating mass (ERM) actuator or linear resonant actuator (LRA), or may induce haptic effects using technologies that include electroactive polymers, piezoelectric materials (e.g., as a beam, disk, etc.), other technologies involving electrostatic or subsonic audio wave surface actuation.

A.21.4 The inventive method of A.21 wherein the at least one output device comprises RF circuitry coupled to an antenna.

The antenna can be any antenna for transmitting information via any wireless network.

Alternatively, or additionally, the device may be connected to a wired network (e.g., occasionally, or in certain modes of operation, such as charging, when docked at a computer or charging station) to download and upload data from and to network servers. For example, the device may be docked into a data storage medium, or connected to a server or network of servers with mass storage, to collect and log sound field and sound field detection results obtained over a period of time in the device for more analysis. One analysis is to track movement of the device over a time period, and update a database of sound field and their associated metadata, including location and other sensor data captured in the surrounding environment. This latter approach enables the construction of the sound field and location database to be constructed over time via a crowdsourced approach, in which sound field data is compiled from several different user devices and aggregated into a database of sound fields, each with corresponding images of the environment of the sound field, and the location of that environment. This approach can be used to augment databases used to build RF signal maps, such as those used to map wifi access points and other types of RF beacons (e.g., Bluetooth beacons) based on plural location measurements (GPS, cellular, beacon, wifi, etc.), wifi signal strength, and wifi device ID for locations over an area for which locations services are to be provided.

Likewise, a similar database may be constructed from devices within vehicles and transportation infrastructure (e.g., traffic control lights), and communicated to servers to augment map databases with sound field data at locations where the sound field data is sampled.

Additionally, the device may interconnect to other types of networks, e.g., like an optical network or a network in which data is communicated via IR signaling.

Furthermore, devices can be adapted for monitoring or surveillance roles. In these roles, the portable attribute of the device makes it easy to install and re-configure within an environment to be monitored. Yet, in operation, it is stationary and tracks sound fields from stationary and moving objects within its environment. Additionally, the device may be incorporated into other types of devices that are typically installed within a venue, such as lighting, irrigation, camera surveillance, audio systems, wireless network nodes, or beacons (e.g., RF, audio, etc.). For example, audio monitoring of a parking facility may be implemented with acoustic vector sensors and associated DSP processing integrated into lighting fixtures within the facility or parking lot.

2nd General Inventive Feature Set—Similar to the 1st, but Specifically Tied to Detecting Motion of a Mobile Device.

B. A method comprising:

at a mobile device located within an environment having a sound source from which sound is propagating, capturing vector component within an acoustic field proximate to a mobile device arranged within the environment;

processing the captured vector component to generate acoustic vector data therefrom, the acoustic vector data describing at least one attribute of an acoustic feature of the environment at the device within the environment;

monitoring the acoustic vector data to detect a change in the acoustic vector field proximate to the mobile device; and by reference to a detected change in the acoustic vector field, determining a change in a spatial arrangement of the mobile device.

The mobile device is intended to include smartphones and wearables, as well as electronic devices within vehicles, including robotic vehicles, cars and trucks, and drones of various kinds. These devices can be devices intended for indoor use (in homes, shopping centers, industrial facilities, venues, airports), outdoor use, aerial use, and within transportation vehicles on roadways.

Drones include multi-copter aerial vehicles and indoor helium balloon with guidance propellers, for example. On such devices, prop noise may be loud, but the environmental audio can be used aid location. This particular true where sound from non-stationary objects to be located/tracked/avoided is part of the sound-field, such as animals (dog barking), or other machines/moving vehicles.

The mobile device is also intended to include Virtual Reality headsets or devices. Examples of these devices include the HTC Vive from HTC, Oculus Rift from Facebook, and Google Cardboard from Google. The above described processing of the acoustic vector component can be used to determine indoor location and orientation or be fused with additional orientation sensor data from the compass, gyroscope and accelerometer sensors to provide location and pose of the headset.

The Act of "Determining"

B.1 The inventive method of B wherein determining comprises estimating a change in location of the mobile device within the environment.

B.2 The inventive method of B wherein determining comprises estimating a change in orientation of the mobile device within the environment.

B.3 The inventive method of B further comprising, upon detecting a change in the acoustic vector field, determining whether a location of the least one acoustic feature identified in the acoustic vector field changes; and determining the change in spatial arrangement of the mobile device upon determining that a location of the at least one acoustic feature identified in the acoustic vector field has changed.

This method addresses the point that not all change in acoustic features are indicative of device motion—only changes that involve movement of acoustic feature across the acoustic vector field should indicate device motion.

B.4 The inventive method of B further comprising receiving, from at least one auxiliary sensor associated with the mobile device, auxiliary data describing a spatial arrangement of the device relative to a frame of reference independent of the at least one sound source;

monitoring the auxiliary data to detect a change in the auxiliary data; and determining the change in spatial arrangement of the mobile device upon detecting a change in the auxiliary data.

The auxiliary data can be data indicative of the location, orientation, altitude, etc., of the device (e.g., as sensed by one or more auxiliary sensors such as a GPS sensor, compass, accelerometer, gyroscope, magnetometer, barometer, etc.).

This method exploits the fact that changes in acoustic features should be interpreted as indicative of device motion when other sensors on the device indicate that the device is moving.

Additional Features: Interpreting Motion of the Mobile Device as a Gesture Input.

B.5 The inventive method of B determining whether the change in spatial arrangement of the mobile device corresponds to a predetermined gesture input; and modifying an operation of at least one output device associated with the mobile device when the change in spatial arrangement of the mobile device corresponds to the predetermined gesture input.

In one embodiment, the mobile device comprises a processor configured to control the output device, and a memory configured to store data defining the predetermined gesture input and instructions that, when executed by the processor, cause the processor to perform the method steps described.

Alternatively, the processor can be part of a cloud-computing platform that is accessible to the mobile device via some network connection.

An output device is "associated with" the mobile device if it is (directly or indirectly) communicatively coupled to the processor. The output device and processor can be co-located within a common housing (e.g., as a smartphone housing contains a display, loudspeaker, haptic actuator and a processor), or output device can be located remotely from the processor.

B.5.1 The inventive method of B.5 wherein the at least one output device comprises a display.

As noted above in A.21.1, the display can be of the LCD, LED, OLED, or QD varieties. It may also be a projector.

B.5.2 The inventive method of B.5 wherein the at least one output device comprises a loudspeaker.

B.5.3 The inventive method of B.5 wherein the at least one output device comprises a haptic actuator.

B.5.4 The inventive method of B.5 wherein the at least one output device comprises RF circuitry coupled to an antenna.

3rd General Inventive Feature Set—Gesture Input but does not Necessarily Depend on Device Motion.

C. A method comprising:

at an electronic device located within an environment having a sound source from which sound is propagating, capturing a vector component of an acoustic field proximate to the electronic device arrangement within the environment;

processing the captured vector component to generate acoustic vector data therefrom, the acoustic vector data describing at least one attribute of an acoustic feature of the environment at the device;

monitoring the acoustic vector data to detect a change in a vector component of the acoustic vector field;

determining whether a detected change in the vector component corresponds to a predetermined gesture input; and controlling at least one output device associated with the device to generate an output when the change in acoustic vector field corresponds to the predetermined gesture input.

The Act of "Determining"

C.1 The inventive method of C wherein determining whether a detected change in the vector component corresponds to a predetermined gesture input comprises determining whether the detected change is indicative of the presence of an object that modifies the sound propagating from the sound source.

Modification of sound can be realized as absorbing, reflecting, refracting or diffusing of sound propagating from the sound source (e.g., a human hand, finger, arm, head, etc., a stylus, a game controller, etc.

C.2 The inventive method of C wherein determining whether a detected change in the vector component corresponds to a predetermined gesture input comprises determining whether the detected change is indicative of the presence of an additional sound source generating a sound signal having at least one attribute different from the sound propagating from the sound source.

The additional sound source can be a user uttering a sound, clapping, snapping, or otherwise making some type of sound, a device emitting a sound (e.g., a radio, an ultrasonic beacon, a chirp, etc.

The attribute can include frequency, amplitude, tone, direction of travel, location of source, etc.

C.3 The inventive method of C further comprising receiving, from at least one auxiliary sensor associated with the electronic device, auxiliary data describing a spatial arrangement of the device relative to a frame of reference independent of the sound source;

monitoring the auxiliary data to detect a change in the auxiliary data; and upon detecting a change in the auxiliary data, identifying at least part of a detected change in the vector component that does not correspond to the detected change in the auxiliary data, wherein determining whether a detected change in the vector component corresponds to a predetermined gesture input comprises determining whether a detected change in the identified vector component corresponds to the predetermined gesture.

The auxiliary data can be data indicative of the location, orientation, altitude, etc., of the device (e.g., as sensed by one or more auxiliary sensors such as a GPS sensor, accelerometer, gyroscope, magnetometer, barometer, etc.).

This method addresses a scenario in which the electronic device is a mobile device, and a user is moving the device within the environment while also trying to interact gesturally with the device. In this scenario, the process detects and either removes or ignores changes in the acoustic vector field that are attributable to the device's movement, focusing only on changes in the acoustic vector field that are attributable to the user trying to interact with the device.

C.4 The inventive method of C further comprising receiving, from at least one auxiliary sensor associated with the electronic device, auxiliary data describing a spatial arrangement of the device relative to a frame of reference independent of the sound source;

monitoring the auxiliary data to detect a change in the auxiliary data; and upon detecting a change in the auxiliary data, interpreting any detected change in the vector component as not corresponding to any predetermined gesture.

Auxiliary data can be data indicative of the location, orientation, altitude, etc., of the device (e.g., as sensed by one or more auxiliary sensors such as a GPS sensor, accelerometer, gyroscope, magnetometer, barometer, etc.).

This method addresses a scenario in which the electronic device is a mobile device, and a user is moving the device within the environment, and we want to eliminate all possibility that the device thinks the user is gesturally interacting with it.

The "Output Device"

C.5 The inventive method of C wherein the at least one output device comprises a display.

As noted above in A.21.1, the display can be of the LCD, LED, OLED, or QD varieties. It may also be a projector.

C.6 The inventive method of C wherein the at least one output device comprises a loudspeaker.

C.7 The inventive method of C wherein the at least one output device comprises a haptic actuator.

C.8 wherein the at least one output device comprises RF circuitry coupled to an antenna.

4th Inventive Feature Set

D. A method comprising:

receiving sensor data from at least one auxiliary sensor associated with a device having a first acoustic vector sensor operable to capture a vector component of an acoustic field proximate to the device, from a first location relative to the device;

by reference to the received sensor data, determining whether an orientation of the device corresponds to a first predetermined orientation; and operating the first acoustic vector sensor to capture the vector component when the determined orientation corresponds to the first predetermined orientation.

This method provides an example of sensor fusion. In this method, the first auxiliary sensor may be located at, for example, a back side of a smartphone (where the smartphone's primary camera is located; the front side of the smartphone would typically be where the user display is located). If the smartphone is lying on a desk with the back side down, the auxiliary sensor would detect this and deactivate the first acoustic vector sensor. However, the auxiliary sensor could detect when the smartphone is tilted (e.g., at an angle of elevation in a range of) 20°-110° and then activate the first acoustic sensor. Of course, other exemplary implementations are possible.

D.1 The inventive method of D wherein the auxiliary sensor includes at least one sensor selected from the group consisting of an accelerometer, a gyroscope, a magnetometer, a barometer and a light sensor.

D.2 The inventive method of D further comprising deactivating the first acoustic vector sensor only when the determined orientation corresponds to the first predetermined orientation.

D.3 The inventive method of D further comprising processing the captured vector component field to generate acoustic vector data when the determined orientation corresponds to the first predetermined orientation, the acoustic vector field data describing an acoustic feature of the environment at the position of the device within the environment.

D.3.1 The inventive method of D further comprising processing the captured vector component to generate the acoustic vector data only when the determined orientation corresponds to the first predetermined orientation.

D.4 The inventive method of D wherein the device includes a second acoustic vector sensor configured to capture an acoustic vector field of an environment surrounding the device from a second location relative to the device, the method further comprising:

by reference to the received sensor data, determining whether an orientation of the device corresponds to a second predetermined orientation different from the first predetermined orientation;

capturing an acoustic vector field of the environment with the second acoustic vector sensor when the determined orientation corresponds to the second predetermined orientation.

D.4.1 The inventive method of D wherein the second location is on a side of the device that is opposite the first location.

5th General Inventive Feature Set

E. A method comprising:

receiving sensor data from at least one auxiliary sensor associated with a device having a first acoustic vector sensor operable to capture a vector component of an acoustic field proximate to the device when the device is arranged in a predetermined orientation;

by reference to the received sensor data, determining whether an orientation of the device corresponds to an orientation other than the predetermined orientation; and deactivating the acoustic vector sensor when the determined orientation corresponds to an orientation other than the predetermined orientation.

This method is applicable to deactivating other types of sensors (e.g., image sensors, microphones, etc.).

6th General Inventive Feature Set

F. A method comprising:

receiving sensor data from at least one auxiliary sensor associated with a device having a first acoustic vector sensor configured to capture a vector component of an acoustic field proximate to the device;

by reference to the received sensor data, determining whether an orientation of the device corresponds to a predetermined orientation; and processing the captured vector component to generate acoustic vector data when the determined orientation corresponds to the predetermined orientation, the acoustic vector field data describing an acoustic feature of the environment at the device.

F.1 The inventive method of F wherein processing the captured vector component comprises performing multipath correction.

Multipath correction can be performed using a rake receiver, etc.

F.2 The inventive method of F wherein processing the captured vector component comprises performing a feature detection process.

The feature detection process can include SIFT, SURF, etc. or trained classifiers, such as those employing CNN or SVM.

F.3 The inventive method of F wherein processing the captured vector component comprises processing the second acoustic vector data to identify at least one substantially stationary acoustic feature.

Acoustic features that are identified as moving (e.g., during the second time period) can be filtered out.

F.4 The inventive method of F wherein processing the captured vector component comprises estimating a direction of arrival (DOA) for the acoustic feature.

The localization processes can include parametric techniques (e.g., Root-MUSIC, MUSIC, Capon, beamforming, etc. as detailed in the teachings incorporated above. Localization alternatives include continuous sound direction estimation with beamforming. As described above, certain embodiments convert the signals from an acoustic vector sensor into a sound map.

F.5 The inventive method of F wherein processing the captured vector component comprises estimating at least one of a sound pressure, a sound intensity, and a frequency of sound emanating from the acoustic feature.

7th General Inventive Feature Set

G. A method comprising:
receiving an audio signal from a microphone, the audio signal corresponding to sound propagating through an environment and captured by the microphone;
capturing a vector component of an acoustic field proximate to the microphone;
processing the captured vector component to generate acoustic vector data describing at least two acoustic features associated with the captured sound; and
processing the audio signal based on the acoustic vector data to enhance the perceptibility of a first one of the at least two acoustic features relative to a second one of the at least two acoustic features.

On "Processing the Captured Vector Component" in Method G

See, e.g., F.1-F.4 above.

On "Processing the Audio Signal"

G.1 The inventive method of G wherein processing the audio signal comprises suppressing the second one of the at least two acoustic features.

In this case, the second one of the at least two acoustic features corresponds to an unwanted noise, such as a background or ambient noise.

However, the background noise does not require suppressing for certain detection applications. Directional resolving of the acoustic vector reduces off-axis. Additionally, one may opt to employ a CNN method rather than seeking to affirmatively suppress background sound. CNN methods are not adversely impacted by background noise in the sound map (e.g., spherical sound image). The CNN, as described above, has initial convolution layers that operated on local features, aggregating up throughout the sound map to build up an overall sound feature list.

G.2 The inventive method of G wherein processing the audio signal comprises cancelling the second one of the at least two acoustic features.

In this case, the second one of the at least two acoustic features corresponds to one or more echoes.

One embodiment employs a CNN on a sound map. The sound map is generated by resolving the plural axes of the acoustic vector sensor (e.g., X, Y, and Z) into a spherical sound image, or mapping of such to a 2D array or 3D array (with a temporal or spectral component). The CNN processing labels detected features within the sound map with the most likely sound features (e.g., sound sources or objects).

Additional Features

G.3 The inventive method of G further comprising rendering the processed audio signal through a loudspeaker.

G.4 The inventive method of G further comprising storing the processed audio signal in a machine-readable medium.

G.5 The inventive method of G further comprising transmitting the processed audio signal via an RF antenna.

G.6 The inventive method of G further comprising receiving an image signal from an image sensor, the image signal corresponding to imagery of a scene within the environment and captured by the image sensor contemporaneously with the capture of sound by the microphone.

G.6.1 The inventive method of G wherein the first one of the at least two acoustic features corresponds to a sound emanating from a sound source within the captured imagery.

Alternatively, the first one of the at least two acoustic features could correspond to a sound emanating from a sound source outside the captured imagery.

G.6.2 The inventive method of G wherein the second one of the at least two acoustic features corresponds to a sound emanating from the sound source outside the captured imagery.

Alternatively, the second one of the at least two acoustic features could correspond to a sound emanating from a sound source within the captured imagery.

G.6.3 The inventive method of G further comprising receiving a user input signal from an input device, the user input signal corresponding to a user's identification of the first one of the at least two acoustic features within the scene,
wherein processing the audio signal based on the acoustic vector data comprises processing the audio signal based on the acoustic vector data upon receiving the user input signal.

G.6.3.1 The inventive method of G wherein the input device includes a touch screen.

8th General Inventive Feature Set

H. A system, comprising:
a housing;
an acoustic port extending through the housing;
an acoustic vector sensor arranged within the housing and in fluid communication with an environment surrounding the device via the acoustic port, the at least one acoustic vector sensor configured to capture a vector component of an acoustic field proximate to an exterior of the device at the acoustic port and convert the captured vector component into an electrical signal;
an output device; and
a processor configured to access the electrical signal and control an operation of the output device based, at least in part, on the accessed electrical signal.

"Acoustic port" is basically an opening or a localized collection of closely-spaced openings through which a sound wave can propagate. Sound waves propagate through the acoustic port easier than through the housing.

On the "Housing"

H.1 The system of H wherein at least a portion of the housing is formed of a material selected from the group consisting of: a metal, a ceramic, a glass, a glass-ceramic and a polymer.

H.2 The system of H wherein the housing a device housing for a device selected from the group consisting of: a handheld computer, a smartphone, a tablet computer, a laptop computer, a desktop computer, a wearable computer (e.g., wearable on a user's finger, wrist, arm, head, ear, leg, waist, etc.), a media player, a household appliance (e.g., thermostat, refrigerator, microwave, intercom, baby monitor, security system, etc.), a game console, a game controller, a remote control, etc.

On the "Acoustic Port"

H.3 The system of H wherein the acoustic port comprises an opening extending through the housing.

H.4 The system of H wherein the acoustic port comprises a localized collection of closely-spaced openings extending through the housing.

H.5 The system of H wherein the acoustic port further comprises an acoustic mesh coupled to the housing and extending across the opening (or openings).

The acoustic mesh improves the aesthetic appearance of the device (e.g., mask the opening in the housing) without undesirably impeding the passage of sound waves into (or out of) the acoustic port.

On the "Acoustic Vector Sensor"

H.6 The system of H further comprising a plurality of acoustic vector sensors.

H.6.1 The system of H of H.6 wherein at least two of the plurality of acoustic vector sensors are in fluid communication with the environment surrounding the device via the acoustic port.

H.6.2 The system of H.6 further comprising a plurality of acoustic ports, wherein at least two of the plurality of acoustic vector sensors are in fluid communication with the environment surrounding the device via different ones of the plurality of acoustic ports.

H.7 The system of H wherein the plurality of acoustic vector sensors includes:

a first acoustic vector sensor configured to capture a first vector component of the acoustic field, the first vector component extending in a first direction relative to the device;

and a second acoustic vector sensor configured to capture a second vector component of the acoustic field, the first vector component extending in a second direction relative to the device.

H.7.1 The system of H.7 wherein the first direction is opposite the second direction.

H.7.2 The system of H.7 wherein the first direction is perpendicular to the second direction.

H.7.3 The system of H.7 wherein the plurality of acoustic vector sensors further includes a third acoustic vector sensor configured to capture a third vector component of the acoustic field, the third vector component extending in a third direction relative to the device.

H.7.3.1 The system of H.7.3 wherein the third direction is opposite the second direction.

H.7.3.2 The system of H.7.3 wherein the third direction is perpendicular to the second direction.

H.8 The system of H wherein the plurality of acoustic vector sensors includes at least one array of acoustic vector sensors.

H.9 The system of H wherein the acoustic vector sensor includes a particle velocity sensor.

H.9.1 The system of H.9 wherein the particle velocity sensor includes a hot-wire anemometer.

H.9.1.1 The system of H.9.1 wherein the hot-wire anemometer comprises a two-wire hot-wire anemometer.

H.9.1.2 The system of H.9.1 wherein the hot-wire anemometer is a hot-wire anemometer array comprising a plurality of hot-wire anemometers.

H.9.1.2.1 The system of H.9.1.2 wherein the hot-wire anemometer array includes a first hot-wire anemometer having a first wire and a second wire disposed in a first plane, the first wire and the second wire extending along a first direction.

H.9.1.2.1.1 The system of H.9.1.2.1 wherein the hot-wire anemometer array further includes a second hot-wire anemometer having a third wire and a fourth wire disposed in the first plane, the third wire and the fourth wire extending along a second direction perpendicular to the first direction.

Alternatively, the third wire and the fourth wire can be disposed in a different plane that is coplanar with the first plane. Alternatively, the second direction need not be strictly perpendicular (though orthogonality among the pairs of wires is preferred).

H.9.1.2.1.2 The system of H.9.1.2.1 wherein the hot-wire anemometer array further includes a third hot-wire anemometer having a fifth wire and a sixth wire disposed in a second plane.

H.9.1.2.1.2.1 The system of H.9.1.2.1.2 wherein the second plane is perpendicular to the first plane.

H.9.1.2.1.2.2 The system of H.9.1.2.1.2 wherein the fifth wire and the sixth wire extend along the first direction.

H.9.1.2.1.2.3 The system of H.9.1.2.1.2 wherein the fifth wire and the sixth wire extend along the second direction.

H.9.1.2.1.2.4 The system of H.9.1.2.1.2 wherein the fifth wire and the sixth wire extend along a third direction perpendicular to the first direction (and perpendicular to the second direction).

Alternatively, the third direction need not be strictly perpendicular to the first or second direction (though orthogonality among the pairs of wires is preferred.

H.10 The system of H wherein the acoustic vector sensor includes a pressure gradient sensor.

H.10.1 The system of H.10 wherein the pressure gradient sensor includes a microelectromechanical system) (MEMS) pressure sensor array.

H.11 The system of H wherein the acoustic vector sensor includes an optical microphone.

For example, the optical microphone is of the type manufactured by SINTEF's MinLab.

H.12 The system of H wherein the acoustic vector sensor does not protrude beyond the exterior surface of the device.

On the "Output Device" . . .

H.13 The system of H wherein the output device is disposed within the housing.

Alternatively, the output device can be external to the housing.

H.14 The system of H wherein the output device comprises a display.

H.15 The system of H wherein the output device comprises a loudspeaker.

H.15.1 The system of H.15 wherein the output device comprises one selected from the group consisting of headphones and earphones.

H.16 The system of H wherein the at least one output device comprises a haptic actuator.

H.16.1 The system of H.16 wherein the haptic actuator is configured to render a haptic effect to the housing.

H.17 The system of H wherein the at least one output device comprises RF circuitry coupled to an antenna.

On the "Processor" . . .

H.18 The system of H wherein the processor is disposed within the housing.

VIII. Concluding Remarks

Having described and illustrated the principles of our inventive work with reference to illustrative examples, it will be recognized that the technology is not so limited.

Similarly, while reference was made to app software on a smartphone that performs certain of the detailed functionality, in other embodiments these functions can naturally be performed otherwise—including by operating system software on the smartphone, by a server at a social networking service, by another smartphone or computer device, distributed between such devices, etc.

While reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

The technology may be employed audio processors that are used in conjunction with in-ear devices. In particular, the methods and associated hardware implementation of them may be incorporated into in-ear DSP hearing devices, where an acoustic head-model is used. One example of such wearable device is the Here active listening device from Doppler Labs, which has a wearable part (in-ear DSP) and a companion mobile application executing on the user's smartphone.

When a sound is to be masked out, or enhanced, being able to separate that sound source by knowing the direction of approach to one ear can help in removing it from the other ear when the sound is not directly in "line-of-sight". (e.g., sound approaching the left ear directly with an indirectly detected sound on the right ear).

The sound enhancing in-ear DSP, may be programmed to respond to audio watermarks, by switching operating mode, or turning on/off specific audio filters. For example, in the case of emergency alerts, the digital watermark in the emergency alert sound is detected by the in-ear DSP and triggers a mode in which other audio sources are turned off or filtered out.

Digital watermarks may be used to prioritize the processing of audio by the in-ear DSP. The user can select which watermarked sounds to have the in-ear DSP control for him by selecting these sounds in the companion mobile application. For announcements, each has a unique watermark embedded in the announcement. The smartphone app sets specific announcements to be detected by the in-ear DSP, which upon detection, triggers the corresponding audio processing mode of operation, which passes desired sounds, while blocking others. The desired sounds may be sounds to be passed through to the ear by the in-ear DSP, or additional sounds to be played into the user's ear, such as an alert tone.

For concerts, concert music with watermarks embedded toggle different effects in the in-ear DSP.

Particularly contemplated smartphones include the Apple iPhone 5; smartphones following Google's Android specification (e.g., the Galaxy S4 phone, manufactured by Samsung, and the Google Moto X phone, made by Motorola), and Windows 8 mobile phones (e.g., the Nokia Lumia 1020, which features a 41 megapixel camera).

Details of the Apple iPhone, including its touch interface, are provided in Apple's published patent application 20080174570.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

The processes and system components detailed in this specification may be implemented as instructions for computing devices, including general purpose processor instructions for a variety of programmable processors, including microprocessors (e.g., the Intel Atom, the ARM A5, the Qualcomm Snapdragon, and the nVidia Tegra 4; the latter includes a CPU, a GPU, and nVidia's Chimera computational photography architecture), neural processing unit (NPU), such as those in the Qualcomm snapdragon 820 processor series, graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits —including digital, analog and mixed analog/digital circuitry. Execution of the instructions can be distributed among processors and/or made parallel across processors within a device or across a network of devices. Processing of data may also be distributed among different processor and memory devices. As noted, cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Extraction of fingerprint and watermark data from content is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

As indicated, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A headworn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc.) Exemplary wearable technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

Embodiments of the present technology can also employ neuromorphic processing techniques (sometimes termed "machine learning," "deep learning," or "neural network technology"). As is familiar to artisans, such processors employ large arrays of neuron-like elements—interconnected to mimic biological synapses. Such processors employ programming that is different than the traditional, von Neumann, model. In particular, connections between the circuit elements are weighted according to correlations in data that the processor has previously learned (or been taught). When a pattern of data (e.g., a set of audio, image or other sensor data) is applied to the processor (i.e., to inputs of several of the circuit elements), certain nodes may spike while others remain relatively idle. Each of these nodes may serve as an input to plural other circuit elements, triggering further spiking in certain other nodes—a chain reaction that ultimately provides signals to output nodes to indicate the results of the neuromorphic processing. (In addition to providing output signals responsive to the input data, this process can also serve to alter the weightings, training the network to better respond to certain patterns that it has seen (i.e., processed) before.) Such techniques are well suited for pattern recognition applications, among many others.

Additional information on such techniques is detailed in the Wikipedia articles on "Machine Learning," "Deep Learning," and "Neural Network Technology," as well as in Le et al, Building High-Level Features Using Large Scale Unsupervised Learning, arXiv preprint arXiv:1112.6209 (2011), and Coates et al, Deep Learning with COTS HPC Systems, Proceedings of the 30th International Conference on Machine Learning (ICML-13), 2013. These journal papers, and then-current versions of the "Machine Learning" and "Neural Network Technology" articles, are attached as appendices to patent application 61/861,931, filed Aug. 2, 2013. The non-provisional counterpart of application No. 61/861,931, is U.S. application Ser. No. 14/449,821, which is now published as US Patent Application Publication 2015-0055855. As noted above, software code for implementing a CNN is available in source code form in open source projects, such as cuda-convnet and cuda-convnet2, and derivatives thereof.

Various references were made to context. The artisan will understand that context refers to any information useful in characterizing the situation of an entity (an entity being a person, place or object that is considered relevant to an interaction between a user and an application, including the user and application themselves).

Context information can be of many sorts, including computing context (network connectivity, resource availability, processor type, CPU contention, etc.), user context (user profile, location, actions, preferences, nearby friends, social network(s) and situation, etc.), physical context (e.g., lighting, noise level, traffic, sensed sounds including speech, etc.), temporal context (time of day, day, month, season, etc.), history of the above, etc.

Another taxonomy of context progresses from simple and concrete, to complex and abstract, starting with location, then physical context (as determined by sensors, e.g., device orientation and motion, temperature, infrared, video, 3D ambient audio, ultrasonic, humidity, gases and other chemical), then actions (e.g., writing, talking, reading, searching, navigating, pointing), then proximities (e.g., to people, vehicles, buildings, perimeters, jurisdictions), then somatic (e.g., live datastreams of biometric information), then data feeds (e.g., subscriptions and RSS feeds, social network follows, alerts and updates), then emergent live data (e.g., from external sources, such as calls, text, email, weather forecasts), and finally n-dimensional context history—encompassing some or all of the foregoing.

Context arrangements suitable for use with the present technology are further detailed in the documents incorporated by reference.

While many of the illustrative embodiments made reference to digital watermarking for content identification, in most instances fingerprint-based content identification (i.e., recognition of inherent, rather than added, patterns) can be used instead.

The techniques of digital watermarking are presumed to be familiar to the artisan. Examples are detailed, e.g., in Digimarc's U.S. Pat. Nos. 6,614,914, 6,590,996, 6,122,403, 20100150434 and 20110274310, as well as in pending application Ser. No. 13/946,968, filed Jul. 19, 2013 (now published as U.S. Pat. No. 9,129,277), and 61/909,989, filed Nov. 27, 2013 (whose US non provisional counterpart application is published as 2015-0016664). Spot colors, as are commonly found on packaging, can be watermarked by leaving tiny voids in the printing to subtly change the luminance or chrominance. Other techniques for watermarking of spot colors are detailed in U.S. Pat. No. 6,763,124 and application Ser. No. 13/975,919, filed Aug. 26, 2013.

Fingerprint-based content identification techniques are also well known. SIFT, SURF, ORB and CONGAS are some of the most popular algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv:0804.4457, 2008.)

Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision-ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

Optical character recognition (OCR) can be similarly employed to identify objects, and can also serve to provide anchor points to which annotations may be spatially referenced.

Use of such identification technologies to obtain object-related metadata is familiar to artisans and is detailed, e.g., in the assignee's patent publication 20070156726, as well as in publications 20120008821 (Videosurf), 20110289532 (Vobile), 20110264700 (Microsoft), 20110125735 (Google), 20100211794 and 20090285492 (both Yahoo!).

Linking from watermarks (or other identifiers) to corresponding online payoffs is detailed, e.g., in Digimarc's U.S. Pat. Nos. 6,947,571 and 7,206,820.

Applicant's other work that is relevant to the present technology includes that detailed in pending patent application Ser. No. 13/651,182, filed Oct. 12, 2012 (now U.S. Pat. No. 8,868,039), Ser. No. 14/074,072, filed Nov. 7, 2013 (now published as 2014-0258110), Ser. No. 13/892,079, filed May 10, 2013 (published as 2014-0164124), and 61/838,165, filed Jun. 21, 2013 (whose non provisional counterpart patent is granted as U.S. Pat. No. 9,269,022), and published applications 20100228632, 20110212717, 20110214044, 20110161076, 20120284012, 20120218444, 20120046071, 20120300974, 20120224743, 20120214515, 20130097630, 20130311329, 20130314541.

Audio watermarking and auxiliary data signaling in acoustic signals is particularly described in assignee's U.S. Pat. No. 9,305,559, and published applications 20120214515, 20150168538, which are hereby incorporated by reference. Publications 20120214515 and 20150168538 particularly describe audio signaling for mobile device positioning.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicants similarly recognize and intend that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. (The reader is presumed to be familiar with such prior work.) Those references disclose technologies and teachings that the applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

I claim:

1. A method comprising:
    obtaining acoustic reference data associated with an environment, the acoustic reference data describing at least one attribute of a sound source from which sound can propagate into the environment;
    capturing with an acoustic vector sensor having plural axes, during a first time period, plural vector components within an acoustic field proximate to a device arranged within the environment;
    processing the captured vector components of a first acoustic vector field by beamforming to generate first acoustic vector data therefrom, the first acoustic vector data describing at least one attribute of an acoustic feature of the environment at the device;
    comparing the first acoustic vector data with the acoustic reference data; and
    determining a spatial arrangement of the device based on the comparing.

2. The method of claim 1 wherein obtaining the acoustic reference data comprises:
    obtaining location data describing a location of the device;
    identifying, from sets of acoustic reference data corresponding to a plurality of locations, acoustic reference data corresponding to the location described by the obtained location data; and
    retrieving the identified acoustic reference data.

3. The method of claim 2 wherein obtaining location data comprises detecting a characteristic of the sound propagating through the environment.

4. The method of claim 2 wherein the sets of acoustic reference data correspond to a plurality of locations within the environment in which sound can propagate.

5. The method of claim 1 wherein obtaining the acoustic reference data comprises:
    capturing with the acoustic vector sensor plural vector components within the acoustic field proximate to the device during a second time period occurring before the first time period; and
    processing the vector components captured during the second time period by beamforming to generate second acoustic vector data therefrom, the second acoustic vector data describing at least one attribute of an acoustic feature within the environment at the device during the second time period.

6. The method of claim 5 wherein processing the vector components captured during the second time period comprises performing a feature detection process.

7. The method of claim 5 wherein processing the vector components captured during the second time period comprises processing the second acoustic vector data to identify at least one substantially stationary acoustic feature.

8. The method of claim 5 wherein processing the vector components captured during the second time period comprises estimating a direction of arrival of sound emanating from the acoustic feature.

9. The method of claim 5 further comprising transmitting a sound signal from the device into the environment such that the sound signal is at least partially reflected within the environment during the second time period while the second acoustic vector data is captured.

10. The method of claim 9 wherein the sound signal comprises a chirp.

11. The method of claim 1 wherein processing the vector components captured during the first time period comprises performing a feature detection process.

12. The method of claim 1 wherein processing the vector components captured during the first time period comprises processing second acoustic vector data captured during a second time period to identify at least one substantially stationary acoustic feature.

13. The method of claim 1 wherein processing the vector components captured during the first time period comprises estimating a direction of arrival (DOA) for the acoustic feature.

14. The method of claim 1 wherein processing the vector components comprises converting plural acoustic vectors from a plural axes configuration of the acoustic vector sensor into a sound map.

15. The method of claim 14 comprising:
    classifying sound sources within the sound map with a convolutional neural network to identify and locate the sound sources within the sound map.

16. A method comprising:
    capturing acoustic vector sensor data from an acoustic vector sensor configuration having plural axes;
    converting plural axes acoustic vector sensor data into a sound map; and
    classifying sound sources within the sound map with a convolutional neural network to identify and locate the sound sources within the sound map, the convolutional neural network being trained to identify sound sources within the sound map by presentation of training sounds to the convolutional neural network, the training sounds being labeled with identifiers, enabling the convolutional neural network to classify sound sources within the sound map; wherein
    the capturing, converting and classifying is performed for plural sets of acoustic vector sensor data, each captured at different times; and further comprising:
    tracking location of sound sources in the sound map over the different times; and
    from tracked location of the sound sources, determining a spatial arrangement of the sound sources in an environment around the acoustic vector sensor configuration; and
    determining a location of a mobile device by matching the spatial relationship with a database of stored spatial relationships of sound sources.

17. The method of claim 16 wherein the acoustic vector sensor configuration is within a mobile device, the method further comprising: rendering the spatial arrangement of the sound sources on a display device of the mobile device.

18. A system, comprising:
    a housing;
    an acoustic port extending through the housing;
    an acoustic vector sensor arranged within the housing and in communication with an environment surrounding the housing via the acoustic port, the at least one acoustic vector sensor configured to capture a vector component of an acoustic field proximate to an exterior of the housing at the acoustic port and convert the captured vector component into an electrical signal;

an output device; and
a processor configured to access the electrical signal and control an operation of the output device based, at least in part, on the accessed electrical signal.

* * * * *